(12) United States Patent
Sivathanu et al.

(10) Patent No.: US 12,353,908 B2
(45) Date of Patent: Jul. 8, 2025

(54) SCHEDULER FOR PLANET-SCALE COMPUTING SYSTEM

(71) Applicant: Microsoft Technology Licensing, LLC, Redmond, WA (US)

(72) Inventors: Muthian Sivathanu, Chennai (IN); Atul Katiyar, Sammamish, WA (US); Dharma Kiritkumar Shukla, Bellevue, WA (US); Rimma Vladimirovna Nehme, Bellevue, WA (US); Shreshth Singhal, Seattle, WA (US); Pankaj Sharma, Redmond, WA (US); Nipun Kwatra, Bangalore (IN); Ramachandran Ramjee, Bengaluru (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 698 days.

(21) Appl. No.: 17/361,224

(22) Filed: Jun. 28, 2021

(65) Prior Publication Data

US 2022/0318052 A1    Oct. 6, 2022

(30) Foreign Application Priority Data

Mar. 30, 2021    (IN) .............................. 202141014650

(51) Int. Cl.
*G06F 9/48*    (2006.01)
*G06F 9/50*    (2006.01)

(52) U.S. Cl.
CPC .......... *G06F 9/4881* (2013.01); *G06F 9/5038* (2013.01); *G06F 9/5088* (2013.01)

(58) Field of Classification Search
CPC .... G06F 9/4881; G06F 9/5038; G06F 9/5088; G06F 9/505; G06F 9/5055; Y02D 10/00
See application file for complete search history.

(56) References Cited

U.S. PATENT DOCUMENTS

2016/0285732 A1\*  9/2016  Brech .............. G06Q 10/06313
2018/0027058 A1\*  1/2018  Balle .................... G02B 6/3893
(Continued)

OTHER PUBLICATIONS

"International Search Report and Written Opinion Issued in PCT Application No. PCT/US22/019214", Mailed Date: Jun. 8, 2022, 9 Pages.

(Continued)

*Primary Examiner* — Tuan C Dao
(74) *Attorney, Agent, or Firm* — Barta Jones, PLLC

(57) ABSTRACT

The disclosure herein describes scheduling execution of artificial intelligence (AI) workloads in a cloud infrastructure platform. A global scheduler receives AI workloads associated with resource ticket values. The scheduler distributes the AI workloads to nodes based on balancing resource ticket values. Local schedulers of the nodes schedule AI workloads on resources based on the resource ticket values of the AI workloads. Based on scheduling the AI workloads, coordinator services of the local schedulers execute the distributed AI workloads on the infrastructure resources of the nodes. The disclosure further describes scheduling AI workloads based on priority tiers. A scheduler receives AI workloads, and each AI workload is associated with a priority tier indicative of a preemption priority while being executed. The AI workloads are scheduled for execution on a distributed set of nodes based on the priority tiers and then execute based on the scheduling.

15 Claims, 9 Drawing Sheets

(56) References Cited

U.S. PATENT DOCUMENTS

| | | | |
|---|---|---|---|
| 2019/0130327 A1* | 5/2019 | Carpenter | H04L 43/20 |
| 2021/0117249 A1* | 4/2021 | Doshi | H04L 67/1001 |
| 2021/0124614 A1* | 4/2021 | Gupta | G06F 11/3409 |
| 2021/0279187 A1* | 9/2021 | Puder | G06F 13/1668 |
| 2021/0406075 A1* | 12/2021 | Illikkal | G06F 9/4881 |
| 2022/0012089 A1* | 1/2022 | Nasr-Azadani | G06N 5/04 |
| 2022/0291953 A1* | 9/2022 | Malvankar | G06F 11/3072 |
| 2023/0012487 A1* | 1/2023 | Makaya | G06F 9/5027 |

OTHER PUBLICATIONS

"Akka", Retrieved from: https://web.archive.org/web/20210413062408/https://akka.io/, Apr. 13, 2021, 4 Pages.

"Checkpoint/Restore in User Space", Retrieved from: https://web.archive.org/web/20210326043234/https://criu.org/Main_Page, Mar. 26, 2021, 3 Pages.

"GRPC, A high-performance, Open-source Universal RPC Framework.", Retrieved from: https://web.archive.org/web/20210416144134/https://grpc.io/, Apr. 16, 2021, 2 Pages.

"Hadoop: Fair Scheduler", Retrieved from: https://hadoop.apache.org/docs/r2.7.4/hadoop-yarn/hadoop-yarn-site/FairScheduler.html, Jul. 29, 2017, 7 Pages.

"The Scala Programming Language", Retrieved from: https://www.scala-lang.org/, Apr. 18, 2021, 13 Pages.

Ausubel, et al., "The Lovely but Lonely Vickrey Auction", In Book Combinatorial Auctions, vol. 17, Jan. 2006, 37 Pages.

Boag, et al., "Scalable Multi-Framework Multi-Tenant Lifecycle Management of Deep Learning Training Jobs", In Proceedings of 31st Conference on Neural Information Processing Systems, Dec. 4, 2017, pp. 1-8.

Burns, et al., "Borg, Omega, and Kubernetes", In Proceedings of ACM Queue, vol. 14, Jan. 2016, pp. 70-93.

Chandra, et al., "Hierarchical scheduling for symmetric multiprocessors", In Journal of IEEE Transactions on Parallel and Distributed Systems, vol. 19, Issue 3, Mar. 2008, pp. 418-431.

Cho, et al., "On the Properties of Neural Machine Translation: Encoder-Decoder Approaches", In repository of arXiv, arXiv:1409.1259v1, Sep. 3, 2014, 9 Pages.

Feitelson, et al., "Utilization and Predictability in Scheduling the IBM SP2 with Backfilling", In Proceedings of the First Merged International Parallel Processing Symposium and Symposium on Parallel and Distributed Processing, Mar. 30, 1998, pp. 542-546.

Ghodsi, et al., "Choosy: Max-min Fair Sharing for Datacenter Jobs with Constraints", In Proceedings of the 8th ACM European Conference on Computer Systems, Apr. 15, 2013, pp. 365-378.

Ghodsi, et al., "Dominant Resource Fairness: Fair Allocation of Multiple Resource Types", In Proceedings of 8th USENIX Conference on Networked Systems Design and Implementation, Mar. 30, 2011, pp. 1-14.

Gog, et al., "Firmament: Fast, Centralized Cluster Scheduling at Scale", In 12th USENIX Symposium on Operating Systems Design and Implementation, Nov. 2, 2016, pp. 99-115.

Grandl, et al., "Graphene: Packing and dependency-aware scheduling for data-parallel clusters", In Proceedings of 12th USENIX Symposium on Operating Systems Design and Implementation, Nov. 2, 2016, pp. 81-97.

Grandl, et al., "Multi-Resource Packing for Cluster Schedulers", In Proceedings of the ACM SIGCOMM Computer Communication Review, vol. 44, Issue 4, Aug. 17, 2014, pp. 455-466.

Gu, et al., "Tiresias: A GPU cluster manager for distributed deep learning", In Proceedings of 16th {USENIX} Symposium on Networked Systems Design and Implementation, Feb. 26, 2019, pp. 485-500.

He, et al., "Deep Residual Learning for Image Recognition", In Proceedings of the IEEE Conference on Computer Vision and Pattern Recognition, Jun. 27, 2016, pp. 770-778.

Hindman, et al., "Mesos: a platform for fine-grained resource sharing in the data center", In Proceedings of 8th USENIX conference on Networked systems design and implementation, vol. 11, Mar. 30, 2011, pp. 1-14.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, pp. 59-72.

Isard, et al., "Quincy: fair scheduling for distributed computing clusters", In Proceedings of the ACM SIGOPS 22nd symposium on Operating systems principles, Oct. 11, 2009, pp. 261-276.

Jeon, et al., "Analysis of large-scale multitenant GPU clusters for DNN training workloads", In proceedings of {USENIX} Annual Technical Conference, Jul. 10, 2019, pp. 947-960.

Jeon, et al., "Multi-tenant GPU Clusters for Deep Learning Workloads: Analysis and Implications", In Microsoft Research Technical Report (MSR-TR-2018-13), May 2018, 14 Pages.

Kingma, et al., "Stochastic gradient VB and the variational autoencoder", In Proceedings of the International Conference on Learning Representations, Apr. 14, 2014, 14 Pages.

Krizhevsky, et al., "CIFAR-10 (Canadian Institute for Advanced Research)", Retrieved from: https://web.archive.org/web/20210125051132/https://academictorrents.com/details/463ba7ec7f37ed414c12fbb71ebf6431eada2d7a, Jan. 25, 2021, 2 Pages.

Li, et al., "Massively Parallel Hyperparameter Tuning", In Repository of arXiv:1810.05934v3, Nov. 29, 2018, 15 Pages.

Martin, et al., "A Database of Human Segmented Natural Images and its Application to Evaluating Segmentation Algorithms and Measuring Ecological Statistics", In Proceedings of the Eighth International Conference on Computer Vision, vol. 2, Jul. 7, 2001, pp. 416-423.

Merkel, Dirk, "Docker: Lightweight Linux Containers for Consistent Development and Deployment", Linux Journal, vol. 239, Mar. 1, 2014, 5 Pages.

Myers, et al., "How to mount Blob storage as a file system with blobfuse", Retrieved from: https://docs.microsoft.com/bs-latn-ba/azure/storage/blobs/storage-how-to-mount-container-linux, Feb. 1, 2019, 7 Pages.

Nisan, et al., "Algorithmic game theory", In Publication of Cambridge University Press, Sep. 24, 2007, 775 Pages.

Peng, et al., "Optimus: An Efficient Dynamic Resource Scheduler for Deep Learning Clusters", In Proceedings of the Thirteenth EuroSys Conference Pattern Recognition, Apr. 23, 2018, 14 Pages.

Picus, et al., "Word-level language modeling RNN", Retrieved from: https://github.com/pytorch/examples/tree/master/word_language_model, Jul. 7, 2020, 3 Pages.

Popa, et al., "FairCloud: Sharing the Network in Cloud Computing", In Proceedings of the ACM SIGCOMM 2012 conference on Applications, technologies, architectures, and protocols for computer communication, Aug. 13, 2012, pp. 187-198.

Radford, et al., "Unsupervised Representation Learning with Deep Convolutional Generative Adversarial Networks", In Repository of arXiv:1511.06434v1, Nov. 19, 2015, 15 Pages.

Sergeev, et al., "Horovod: Fast and Easy Distributed Deep Learning in TensorFlow", In Repository of arXiv:1802.05799v3, Feb. 21, 2018, 10 Pages.

Shi, et al., "Real-time single image and video super-resolution using an efficient subpixel convolutional neural network", In Proceedings of the IEEE Conference on Computer Vision and Pattern Recognition, Jun. 2016, pp. 1874-1883.

Vavilapalli, et al., "Apache Hadoop YARN: Yet Another Resource Negotiator", In Proceedings of the 4th annual Symposium on Cloud Computing, Oct. 1, 2013, 16 Pages.

Waldspurger, Carl A., "Lottery and Stride Scheduling: Flexible Proportional-Share Resource Management", In Doctoral dissertation, Massachusetts Institute of Technology, Sep. 1995, 151 Pages.

Waldspurger, et al., "Lottery scheduling: Flexible proportional-share resource management", In Proceedings of the 1st USENIX conference on Operating Systems Design and Implementation, Nov. 14, 1994, 11 Pages.

Xiao, et al., "Gandiva: Introspective Cluster Scheduling for Deep Learning", In Proceedings of 13th USENIX Symposium on Operating Systems Design and Implementation, Oct. 8, 2018, pp. 595-610.

(56) References Cited

OTHER PUBLICATIONS

Xie, et al., "Aggregated residual transformations for deep neural networks", In Proceedings of IEEE Conference on Computer Vision and Pattern Recognition, Jul. 2017, pp. 1492-1500.
You, et al., "Large Batch Optimization for Deep Learning: Training BERT in 76 Minutes", In Proceedings of 8th International Conference on Learning Representations, Apr. 26, 2020, pp. 1-37.
Yu, et al., "DryadLINQ: A System for General-Purpose Distributed Data-Parallel Computing Using a High-Level Language", In Proceedings of the 8th USENIX Conference on Operating Systems Design and Implementation, vol. 8, Dec. 8, 2008, pp. 1-14.
Chaudhary., Balancing Efficiency and Fairness in Heterogeneous GPU Clusters for Deep Learning, In Proceedings of the Fifteenth European Conference on Computer System, Apr. 27, 2020, 16 Pages.
Lecun, et al., "The Mnist Database of Handwritten digits", Retrieved from: http://yann.lecun.com/exdb/mnist/, Apr. 17, 2021, 7 Pages.
Communication under Rule 71(3) Received for European Application No. 22712725.5, mailed on Nov. 15, 2024, 8 pages.
Communication pursuant to Article 94(3) received in European Application No. 22712725.5, mailed on Aug. 29, 2024, 5 pages.
Decision to grant a European patent pursuant to Article 97(1) Received in European Patent Application No. 22712725.5, mailed on Feb. 27, 2025, 03 pages.

* cited by examiner

SCHEDULER FOR PLANET-SCALE COMPUTING SYSTEM

CROSS-REFERENCE TO RELATED APPLICATIONS

This application claims the benefit of India provisional application number 202141014650 filed on Mar. 30, 2021 and entitled "SCHEDULER FOR PLANET-SCALE COMPUTER", which is hereby incorporated by reference in its entirety for all intents and purposes.

BACKGROUND

The speed and scale of artificial intelligence (AI) innovations require highly scalable, performant, robust, and technically efficient AI infrastructure. Current methods of incrementally extending existing general-purpose infrastructure as a service (IaaS) and cloud-based environments have significant limitations as AI workloads are fundamentally different and necessitate purpose-built AI infrastructure. Furthermore, managing the scheduling of AI workloads on infrastructure in a fair and efficient manner presents substantial challenges to data scientists trying to accelerate the algorithmic innovations of AI.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for scheduling execution of AI workloads in a cloud infrastructure platform is described. A global scheduler receives a set of AI workloads to be executed, wherein each AI workload of the set of AI workloads is associated with a resource ticket value indicative of a share of resources with which that AI workload is to be executed. The global scheduler distributes the set of AI workloads to a set of nodes of the cloud infrastructure platform, wherein each node of the set of nodes includes infrastructure resources for use in executing AI workloads, and wherein the set of AI workloads are distributed to the set of nodes based on balancing resource ticket values of the AI workloads on each node of the set of nodes. A local scheduler of a first node of the set of nodes schedules a subset of AI workloads of the set of AI workloads distributed to the first node to be executed on the infrastructure resources of the first node, wherein the scheduling of the subset of AI workloads is based on the resource ticket values associated with the subset of AI workloads. Then, based on scheduling the subset of AI workloads, a coordinator service of the local scheduler executes the subset of AI workloads on the infrastructure resources of the first node.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 9, the systems are illustrated as schematic drawings. The drawings may not be to scale.

DETAILED DESCRIPTION

Figure 1:
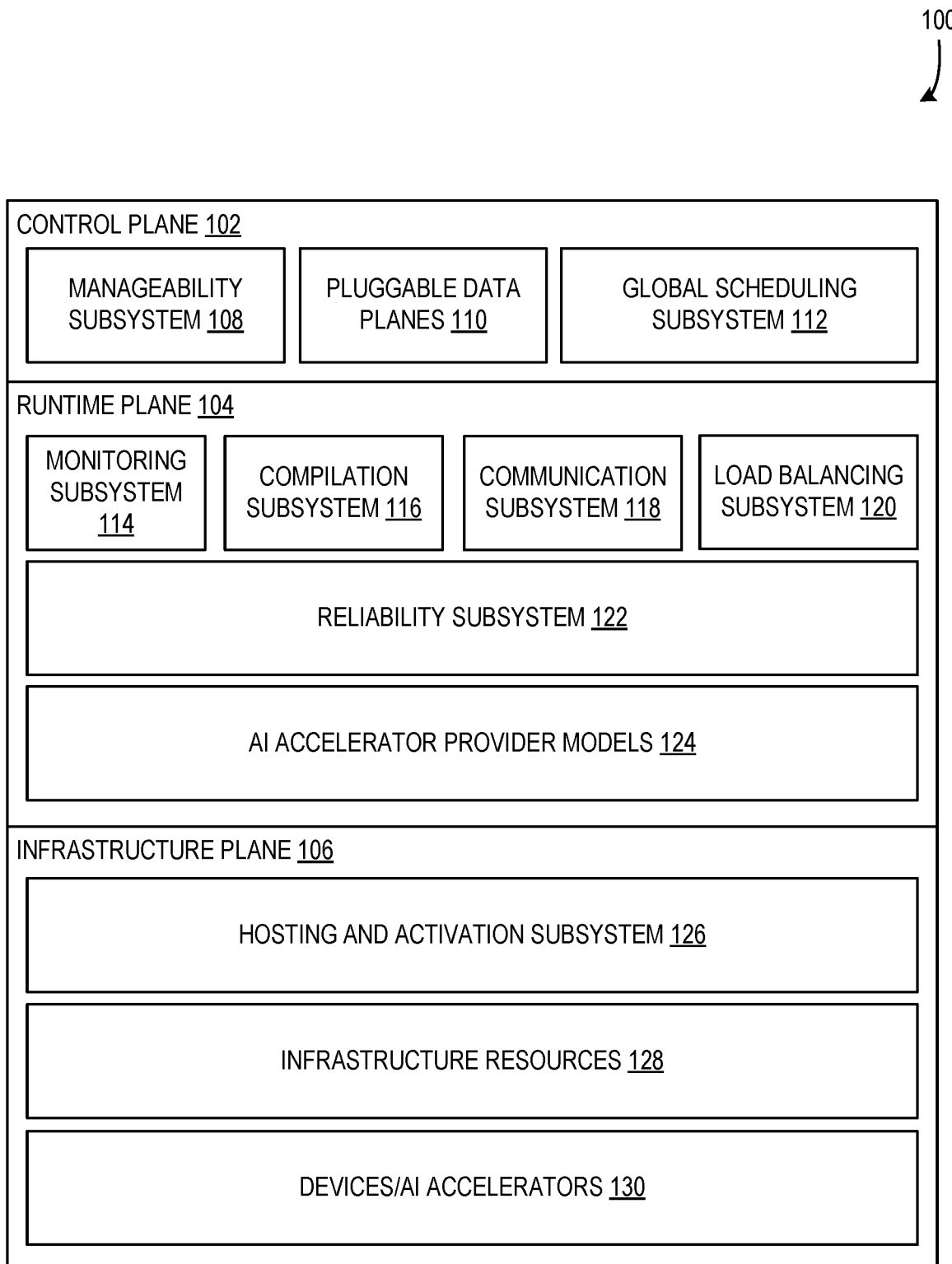
FIG. 1 is a block diagram illustrating a system configured for providing infrastructure service for artificial intelligence (AI) workloads.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure provide a computerized method and system for scheduling the execution of artificial intelligence (AI) workloads, such as training and inferencing workloads, on a diverse pool of infrastructure resources distributed across a variety of regions. A global scheduler receives a set of AI workloads to be executed, wherein each AI workload of the set of AI workloads is associated with a resource ticket value indicative of a share of resources with which that AI workload is to be executed. The global scheduler distributes the set of AI workloads to a set of nodes of the cloud infrastructure platform, wherein each node of the set of nodes includes infrastructure resources for use in executing AI workloads, and wherein the set of AI workloads are distributed to the set of nodes based on balancing resource ticket values of the AI workloads on each node of the set of nodes. A local scheduler of a first node of the set of nodes schedules a subset of AI workloads of the set of AI workloads distributed to the first node to be executed on the infrastructure resources of the first node, wherein the scheduling of the subset of AI workloads is based on the resource ticket values associated with the subset of AI workloads. Then, based on scheduling the subset of AI workloads, a coordinator service of the local scheduler executes the subset of AI workloads on the infrastructure resources of the first node.

The described scheduling systems and methods operate in an unconventional manner by splitting the scheduling tasks between two levels of a global scheduler and regional schedulers, such that the global scheduler enables the system to treat all infrastructure resources in the regions as a single large pool and the use of the regional schedulers reduces the chance that migrating a job across regions is done. Further, in some examples, the described scheduling systems and methods perform load balancing between regions and nodes, enforces fairness between users of the system, and enable automatic training of heterogeneous resources between workloads to enhance the efficiency of the resource distribution and usage.

Cloud infrastructure includes hardware accelerators, computer networking and storage—all of which are bundled together in a workload-aware manner. AI workloads (e.g., Deep Learning Training (DLT) and inferencing) are special in how they operate in that they are written, architected, and execute in a specific manner. Currently, general-purpose cloud-based IaaS are used for DLT and inferencing jobs, which require data scientists to set their AI DLT problems, execute them, and solve any resultant problems that may occur from today's IaaSes.

This has resulted in multiple trends. DLT workloads are growing exponentially (e.g., 10× per year). As a result, the industry is responding to this uptick in DLT workloads by including more hardware in the IaaS environments, e.g., buy more graphics processing units (GPUs) or other hardware accelerators, add more nodes, and build out more distributed clusters. Yet, if the models continue to grow exponentially, it becomes untenable to grow IaaSes in such an exponential manner. There are limits to the size of cloud infrastructures, from a practical standpoint. Aspects of the disclosure solve these and other technical problems in unconventional ways.

The disclosed examples provide a "Singularity" service that increases efficiencies from today's fixed infrastructure resource (including hardware accelerators, networking, storage, etc.) and drives the most technical efficiencies as the models continue to grow or as the number of DLT jobs and/or other AI workloads increase. For instance, the disclosed service operates in an unconventional manner by allowing for an IaaS or other infrastructure to grow to accommodate large numbers of DLT jobs or function as smaller groups of IaaSes that facilitate different DLT job processing. Conventional general-purpose IaaSes are not able to the handle these large increases in DLT jobs because today's general-purpose IaaSes are developed to be workload-agnostic. The disclosed service, on the other hand, is designed to build purpose-built workloads that may be efficiently processed in an IaaS. The AI infrastructure service of the disclosure is operable with all AI workloads, including training (e.g., workloads for training new or updated AI models) and inferencing (e.g., workloads for using trained AI models to evaluate and make inferences from data).

More specifically, an example of the disclosed service is a fully managed, globally distributed, multi-tenant AI infrastructure service with native support for a wide range of hardware including, for example, custom silicon, application-specific integrated circuits (ASIC), graphics processing units (GPU), central processing units (CPU) for DLT job training and inferencing workloads. With the disclosed service, an AI planet-scale computer infrastructure is used for training and inferencing at any scale, with the highest technical efficiency and differentiated capabilities which significantly improves the productivity of data scientists. For example, the disclosed service manages third-party hardware (e.g., GPUs and field programmable gate arrays (FPGAs)) and first-party AI hardware capacity and enabling high-level services, like machine learning (ML), to build experiences and tools to serve customers. In some examples, a first party is a company that operates a cloud environment while a third party is a different company than the company operating the cloud environment.

While the disclosed examples are discussed in relation to DLT jobs and inferences, any kind of AI job may be migrated using the disclosed techniques. Such jobs may be long-running (e.g., processing for several hours or days or weeks or months).

Some of the disclosed embodiments and the examples are operable with the Azure cloud service provided by the MICROSOFT CORPORATION. But any large-scale cloud infrastructure may utilize the disclosed service.

The following are example capabilities that the disclosure provides along with the corresponding technical design description.

The disclosure provides high-efficiency AI training and inferencing by driving the high utilization of resources. Secure, fine-grained multi-tenancy service is provided with high-density containerized hosting. For instance, such service may be provided using Hyper-V isolated containers on bare-metal machines. The disclosed service is able to both securely and densely pack multiple tenants on the same hosts, enabling highly efficient use of compute and AI hardware capacity across the cloud service. High-density workloads that belong to different tenants are enabled. For example, AI workloads can run alongside search workloads.

The disclosure provides multiplexing or interspersing of inferencing and training workloads on the same shared pool of resources. By sharing the same pool of cloud-wide resources for both inferencing and training, more efficient scheduling and packing of workloads is enabled to maximize use of hardware capacity and deal with fluctuations in the mix of workloads and demand for resources of the shared pool. By contrast, in conventional services, inferencing workloads and training workloads are on different pools of resources, fragmenting the capacity. Instead, the disclosed service multiplexes the training and inferencing workloads on the same pool of cloud resources (e.g., hardware accelerators, compute resources, networking resources, and storage resources, etc.). This benefits the ability to further saturate the hardware density and dynamically load balance the cloud resources to adjust to spikes or lulls in computing needs for either the training or inferencing workloads, thereby driving efficiencies to the maximum ability. DLT workloads and inferencing workloads need topological collocation of the nodes and the hardware associated with a job. In some examples, the disclosed service intersperses inferencing workloads on top of or in between training workloads, helping drive efficiencies and finish more jobs through the IaaS.

The disclosed service provides cloud-wide (e.g., global), topology & workload-aware scheduling of AI workloads. A global scheduler is provided to exploit the heterogeneity of workloads (e.g., differing attributes between training jobs, inferencing jobs, etc.) and to provide dynamic, topology-aware scheduling of resources across the entire AI hardware capacity in the cloud. Specifically, with its ability to transparently checkpoint the processor and the device state constituting a job or workload (e.g., saving the state of a workload without any involvement from the user or changes to the frameworks or changes to the training script logic), the disclosed scheduler is able to transparently preempt any running job, live migrate any running job, and/or elastically scale up/down and load balance the workers of the service to drive the highest utilization without impacting the performance or downtime. Additionally, the disclosed scheduler is configured to be aware of all the jobs across the entire IaaS (e.g., a global view of the workload(s) across the entire IaaS). For example, the scheduler used by the disclosed service is configured to identify groups of GPUs/CPUs/hardware accelerators that are not being efficiently utilized and therefore migrate jobs on such groups to other GPUs/

CPUs/hardware accelerators by transparently checkpointing and verifying processor device states for migration to occur. The scheduler is further configured to monitor and/or track workloads that are currently running and hardware capacity that is currently available anywhere around the world in the cloud of the disclosed service. Additionally, the scheduler is configured to decide if and/or when to preempt a job, migrate a job, scale up or scale down the job, or load-balance between different workers for a job.

The disclosed service is configured to manage AI workloads in a priority-driven and/or tier-driven manner. In some examples, the tiers are defined by at least one service level agreement (SLA). When the disclosed scheduler makes decisions regarding AI training or inference workloads, the scheduler may consider the designated tier of a given job (or an inferencing model) or associated job submitter. Each tier may be defined with different technical requirements. For example, if a job is submitted with the highest tier level, indicating a best-capacity tier, the job is run with the least preemption, the equivalent of running on dedicated cloud resources. If a job is submitted at a middle tier, there is some preemption or migration experienced that may "slow" the job somewhat but drive efficiencies and improving the overall utilization of the fixed pool of resources. If the job is submitted at the lowest tier, the job is preempted frequently, providing the experience similar to spot virtual machines (VMs), but with the guarantee that the job will be completed, albeit not necessarily at the fastest pace. Numerous examples exist of different tiers that need not be exhaustively discussed herein, other than to say that DLT training and inferencing jobs may be scheduled based, at least partially, on their associated tier, which may be specific to the job, the customer, and/or the capacity kind. Today, there are no systems that provide tier-based guarantees to DLT training and inferencing jobs.

In some examples, each tenant or job submitter is assigned a quota of system resources (e.g., GPUs) that imposes an upper cap on usage and/or pricing of those resources. Tiers of such resource usage may be provided to tenants (e.g., three tiers based on performance, guaranteed access, and/or priority with respect to preemption). The associated tier may be used to determine the priority of a job when the associated cluster is over-subscribed. In some examples of the disclosure, preemption and elastic rescaling is enabled for all jobs and, as a result, the tiers may be differentiated based on an associated job slowdown percentage.

A job slowdown percentage value may be defined as a function of an ideal time-to-completion ($T_{ideal}$) of a job and a real time-to-completion ($T_{real}$) of the job. The ideal time-to-completion may be defined as the time to complete the job assuming that the job runs on dedicated GPUs with no preemption. The real time-to-completion may differ from the ideal time-to-completion due to over-subscription of the associated cluster, which may require some preemption or scaling of the job. The job slowdown percentage may be calculated as $(T_{ideal}-T_{real})/T_{ideal}$. For example, if the job would have completed in 80 hours with dedicated GPUs, but it took 100 hours with preemption, the job slowdown percentage is 25%. A related throughput fraction value may be calculated as $T_{ideal}/T_{real}$, which would be 80% in the previous example.

Additionally, or alternatively, a value G indicating a quantity of cumulative GPU seconds consumed by a job may be defined. Such a value depends on $T_{ideal}$. In some examples, for a job that requires N GPUs, $G=N*T_{ideal}$. In some examples of the described systems, performance measures of a tenant's jobs (and associated prices that may be charged to the tenant) may be based on the value of G, such that tenants are primarily charged for the actual processing required for their jobs and not for any additional overhead costs of preemption or the like.

In some examples, the performance or priority tiers include three tiers: a high priority tier, a standard priority tier, and a low priority tier. In other examples, more, fewer, or different tiers may be defined without departing from the description. Each of the tiers may be defined by at least one of the following: a guaranteed level of job slowdown percentage value and/or throughput fraction (e.g., a high tier level of 99% throughput fraction, a standard tier level of 80% throughput fraction, and a low tier level of "best effort" to maintain a throughput fraction), a level of preemption frequency (e.g., almost never, infrequently, and frequently for the high, standard, and low tiers respectively), a scale-up priority that determines to which jobs spare capacity is assigned (e.g., high, medium, and low priorities), and/or a topology or locality standard (e.g., always respecting locality, mostly respecting locality, and "best effort" to respect locality for the high, standard, and low tiers respectively).

Further, tier differentiation may also be flexible based on larger jobs, as it may be more difficult to guarantee the defined standards for jobs that required substantial quantities of resources to be used in parallel or otherwise simultaneously (e.g., a job requiring greater than 256 GPUs may require that a locality requirement be reduced to enable the use of 256 GPUs within a reasonable time period).

Given the above-described details with respect to the tier-based scheduling of jobs from multiple tenants, a scheduler of the described systems may prioritize the maximization of overall cluster utilization and aggregate job throughput across the cluster and the minimization of violations of the standards that differentiate the performance or priority tiers. In some examples, the preemption and scheduling policies used by such a scheduler derive from these goals.

For instance, an internal dynamic scheduling score may be defined for each job such that jobs with a lower score always get preempted before preempting a job with a higher score. The scheduling score for a job changes dynamically during the runtime of the job, and may be calculated as $S=S_{base}+S_{dynamic}$. The base score $S_{base}$ is fixed based on the "tier" of the job (e.g., High, Standard, Low). The dynamic component $S_{dynamic}$ is set based on how close the job is to violating tier standards, requirements, and/or rules. A job that is at risk of violating tier standards, requirements, and/or rules may be assigned a high dynamic score so that it does not get preempted.

A challenge with detecting how close a job is to violating a tier standard is that $T_{ideal}$ of the job is unknown. In some examples, tier standards and/or requirements are tracked and maintained for each hour that a job runs. From the time a job is submitted, every elapsed hour of time constitutes a job hour. The scheduler can preserve tier standards for each job hour. If the throughput fraction standard of the job is 80% (e.g. Standard tier), the system may be configured to ensure that, within each job hour, the job gets 80% of the resources it would have gotten if it hadn't been preempted at all.

Thus, for a job that requests N GPUs, the scheduler needs to ensure that it gets at least N*f GPU hours within each job hour, where f is the throughput fraction for the tier (e.g., 80%). At job submission, this can be used to determine the maximum queueing delay permissible for the job (20% of 1 hour=12 minutes in the above example), as any longer delay waiting in queue would result in violation of the tier standards for the first job hour.

Depending on load, a job may get more than the minimum resources required by tier standards for some job hours. For example, it may get N GPUs for a given job hour (instead of the minimum resources of N*f). In such cases, the job may accumulate debt, which can be redeemed by the scheduler in subsequent job hours. For example, if the job got N GPU hours in the first job hour (instead of N*f), during the second job hour, the job may have a tier standard resource requirement of (N*f−slack), where slack is N*(1−f) (i.e., the cumulative excess capacity it got so far). In the 80% example, the job only needs N*0.6 GPU hours to meet tier standards. The dynamic priority within a job hour is thus computed based on the slack available for the job to meet its tier standard requirements.

The GPU hours for a job may be calculated in a way that handles elasticity, as a job can scale up or scale down multiple times. Thus, within a job hour, GPU hours may be calculated based on the actual area-under-the-curve. For example, within a single job hour, if the job got N GPUs for 15 mins, N/2 GPUs for 30 mins and no GPUs for 15 mins, its GPU hours are (15*N+30*N/2+15*0)/60=N*0.5.

In some examples, the above slack-based scheduling to minimize violations of tier standards or requirements, are configured to operate at multiple granularities. For instance, the scheduling may operate at job-level and/or at account-level or tenant-level. Such configurations may provide an option to the tenant to choose tenant-level tier enforcement, which helps in two ways. First, the tenant can specify relative intra-tenant priority among its jobs. Thus, although all of its jobs may be Standard tier, a subset of jobs may be specified as relatively higher priority than other jobs of that tenant. The scheduler, when deciding to preempt jobs of that tenant, may select jobs with a lower intra-tenant priority over jobs with a higher intra-tenant priority. Second, for scaling up, such configurations give better flexibility to the scheduler to scale up jobs that benefit the most from being scaled up (e.g. linear scaling of performance) and run other jobs in a scaled-down mode, while preserving the tenant-level tier standards and/or requirements. Additionally, or alternatively, such features may be configured as opt-in features, as the tenant now needs to incur additional complexity to manage relative priority among its jobs.

Further, in some examples, fairness is enforced when there is excess capacity in the system, and one can do better than the minimum requirements for a tier. For example, the scheduler may be able to provide 95% throughput fraction instead of 80% to a job or jobs. Scale-up elasticity is another scenario where excess capacity can be allocated to jobs. Note that there may not be fairness enforcement across performance or priority tiers (e.g., high tier jobs always get precedence for getting excess resources over lower tier jobs), but within a single performance or priority tier, the scheduler may be configured to allocate excess capacity in a fair manner as described herein.

The disclosed system is configured to provide reliable and performant AI infrastructure. Without reliable infrastructure, utilization will always be sub-optimal. This is because planned and unplanned failures result into lost GPU hours and productivity. For example, if a large job is running for months on hundreds of nodes and GPUs, eventually, some of the GPUs will become unhealthy or need to be upgraded during the job's processing. This has an impact on the customer workload. By virtue of how AI workloads operate, any stall in the health of a GPU may stall the entire AI workload job and progress may be stopped. Worse still, if the job or model has not been checkpointed, precious processing may be lost. To overcome this, the disclosed system provides capabilities such as transparent preemption, dynamic load-balancing, defragmentation, and elasticity that all enable a highly reliable infrastructure.

The disclosure deeply integrates the bare-metal computing, networking, and the driver stacks of a wide range of accelerators by providing at least the following technical contributions: (i) bandwidth optimal distributed barrier and rendezvous protocol implementation directly inside the backend network communication stack to implement distributed agreement protocol among an ensemble of accelerator devices and worker processes, and (ii) transparent and consistent checkpointing and restoration of process and device state to enable transparent preemptive scheduling, failover, live migration, and dynamic elasticity—all without impacting the model convergence and without requiring any help from the user or frameworks. The disclosed service provides for AI jobs to be checkpointed so that their device state may be captured and then restored on other nodes, without impacting the correctness of the model or the model's convergence—at the infrastructure layer.

The disclosed service is configured to provide global distribution of inferencing endpoints for (a) predictable single digit millisecond latencies at 99th percentile (P99), anywhere around the world and (b) high availability in the face of regional disasters. When a user submits an inferencing workload, the inferencing model may be deployed across different geographic regions and run in the closest region.

The disclosed service is configured to provide vertical integration for a wide range of hardware. The example architecture of illustrated in FIG. 1 below is designed for the future, with built-in extensibility to be agile as new scenarios and technologies emerge. The disclosed design is flexible with respect to the following: providing first class support for a wide range of AI accelerators; providing disaggregated and aggregated topologies; providing non-uniform backend network configuration, providing extensible, layered architecture; enabling extensible scheduling systems for customizability by tenants; enabling extensible heterogeneous accelerators, devices, and/or hardware; and providing a compiler tool chain that is agnostic of AI training and inferencing frameworks.

The disclosure provides a unified abstraction on top of a wide range of AI accelerators, and can map a given training job or an inferencing endpoint across a mix of heterogeneous device types to drive the highest efficiency.

Along with supporting standard server-style compute topologies, the disclosed service is configured to support and drive a cloud computing environment's disaggregation strategy and/or other similar strategies associated with other cloud platforms. Aggregated topologies include devices that are physically attached to the servers, such that one does not need to go through a backend network. Disaggregated topologies include a rack of compute nodes and a rack of hardware accelerators that may make use of a backend network. The disclosed service abstracts both of these topologies.

The disclosed service is configured to support a variety of non-uniform backend network architectures envisioned by different first party and third-party hardware manufacturers.

The disclosed service provides a layered architecture that supports extensibility at every level, including pluggable data planes (e.g., the orchestration layer extensibility supports plugging in alternate data planes or an orchestrator below its scheduler to support Kubernetes running in a customer's private data center), pluggable scheduling subsystems (e.g., the scheduling layer extensibility supports plugging in alternate schedulers and custom policies below its control plane to support gradual migration to the disclosed service), and pluggable heterogeneous device types and accelerators (e.g., the disclosure is designed to enable a consistent model for provisioning and scaling accelerator devices with a pluggable device provider interface, including quantum-computing devices).

The disclosed service is configured to provide a compiler toolchain that is agnostic of AI training and inferencing frameworks. The service does not rely on any help from the user or frameworks for providing its core capabilities. It is designed to be agnostic of AI training and inferencing frameworks and tools. It does not require the user to opt into any specific framework, compiler toolchain or library. The service integrates at the level of device drivers and the device-to-device communication channels for supporting various hardware specific capabilities.

The disclosed service provides a highly scalable AI infrastructure. The service is designed to scale across 100s of datacenters and tens of thousands of accelerators with training models of trillions of parameters. The service may be configured to cross-geographical boundaries as well. The architecture is also capable of treating training jobs and inferencing services as equal when they originate from data centers as well as on premises sources.

While the aspects of the disclosure have been described in terms of various examples with their associated operations, a person skilled in the art would appreciate that a combination of operations from any number of different examples is also within scope of the aspects of the disclosure.

While the examples provided involve implementations using GPUs, it will be appreciated that FPGAs, ASICs, or other specialized hardware may be used similarly to carry out the functionality described herein.

FIG. 1 is a block diagram illustrating a system 100 configured for providing infrastructure service for AI workloads according to an embodiment. The system 100 includes a control plane 102, a runtime plane 104, and an infrastructure plan 106. In some examples, the system 100 is a distributed computing infrastructure system that includes hardware devices distributes across many different locations (e.g., a global or planet-scale distributed system). Further, the system 100 is configured specifically to enable the execution of AI workloads, such that the hardware, firmware, and/or software of the system 100 is configured to enable efficient execution of tasks associated with AI workloads. Alternatively, or additionally, the system 100 may include hardware, firmware, and/or software configured specifically to enable the execution of other types of workloads without departing from the description.

The control plane 102 includes a manageability subsystem 108, pluggable data planes 110, and a global scheduling subsystem 112. In some examples, the control plane 102 is configured to receive or accept AI workloads and associated data through a variety of extensible or pluggable data planes 110 that may be defined by the tenants of the system (e.g., plugging in an alternate data plane below the scheduler to support Kubernetes or another similar system running in a tenant's private data center). Those AI workloads are scheduled for execution on the infrastructure of the system 100 (e.g., the infrastructure plane 106), as described herein.

The manageability subsystem 108 includes hardware, firmware, and/or software configured to provide interactive processing of AI workload requests to tenants. Further, the manageability subsystem 108 is configured to provide all infrastructure resources of the system 100 in all regions of the system's operation. In some examples, the manageability subsystem 108 includes manageability replicas in various regions of the system 100 such that the infrastructure resources of the system 100 are multi-mastered by various replicas as an interface between tenants and the system 100. The manageability subsystem 108 may be decoupled from the global scheduler subsystem 112.

The global scheduler subsystem 112 includes hardware, firmware, and/or software configured to schedule AI workloads/jobs for execution on the infrastructure resource of the system 100 as described herein. In some examples, the global scheduler subsystem 112 includes hierarchical schedulers: global scheduler(s), regional schedulers, and coordinator services. The global scheduler is responsible for preparing schedules corresponding to the AI workloads (e.g., jobs, models, and/or pods) and handing them over to the regional schedulers based on those prepared schedules. The regional scheduler is responsible for managing and reporting regional capacity with the global scheduler and then also executing the schedule received from the global scheduler. The coordinator service is responsible for translating the schedules into physical resource allocations across clusters of infrastructure resources within a region. The coordinator service may also constitute or otherwise be closely associated with the reliability subsystem 122 as described herein. The global scheduling sub system 112 is described in greater detail below.

The runtime plane 104 includes subsystems configured to enable the AI workloads to be distributed to and executed on the infrastructure plane 106 as described herein. Such subsystems may include a monitoring subsystem 114, a compilation subsystem 116, a communication subsystem 118, and/or a load balancing subsystem 120. Further, the runtime plane 104 includes a reliability subsystem 122 configured for securing the reliability of execution of AI workloads while enabling such workloads to be checkpointed and/or migrated throughout the infrastructure resources of the system 100. The runtime plane 104 further includes AI accelerator provider models 124 that are configured to enable the use of a variety of libraries and/or configurations for managing AI accelerators when executing AI workloads. The runtime plane 104 is described in greater detail below.

The infrastructure plane 106 includes hardware, firmware, and/or software for executing the AI workloads based on the schedules provided by the control plane 102 and instructions received from the runtime plane 104. The infrastructure plane 106 includes hosting and activation subsystems 126, infrastructure resources 128, and devices/AI accelerators 130. The infrastructure plane 106 is described in greater detail below.

Figure 2:
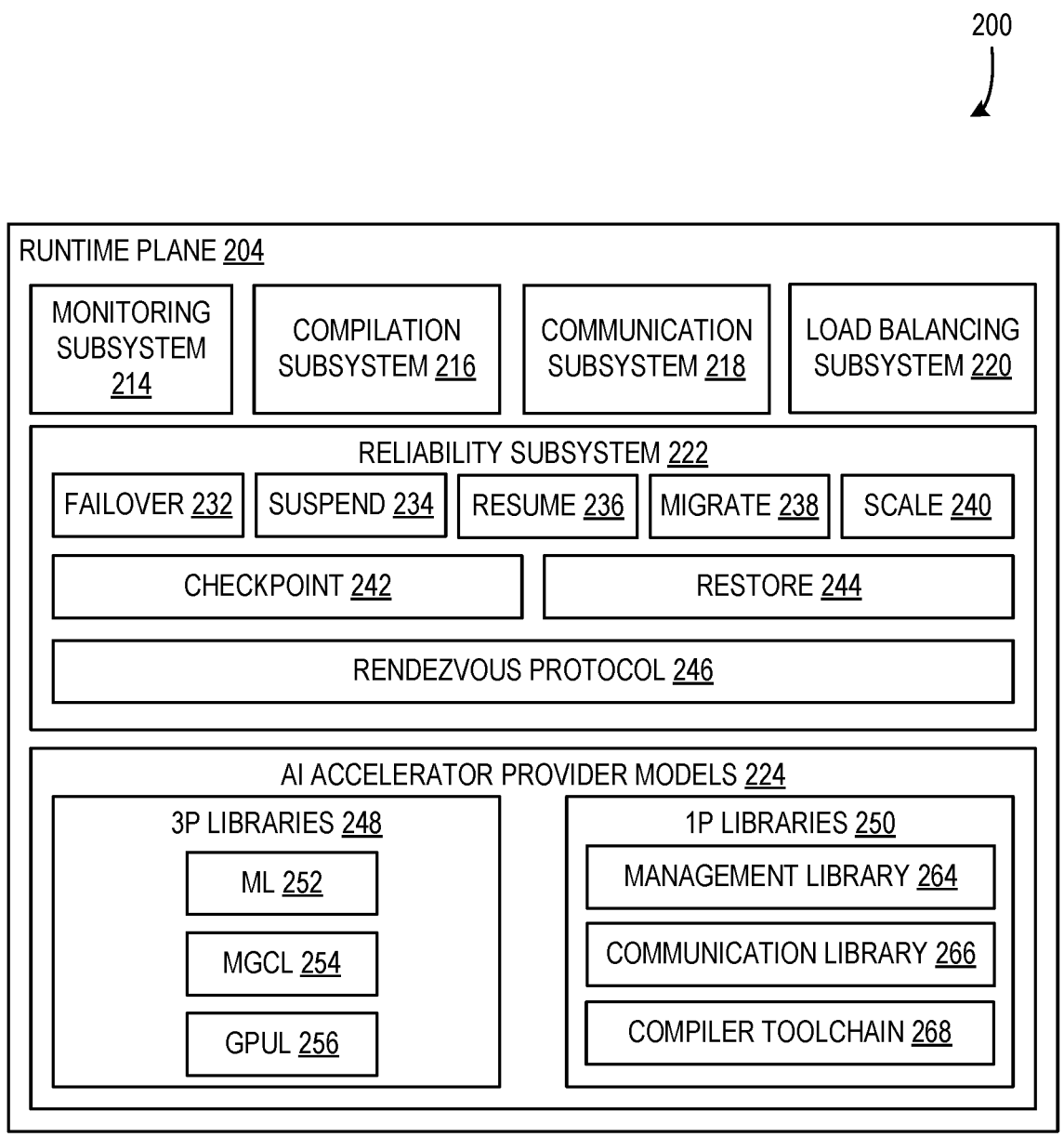
FIG. 2 is a block diagram illustrating a runtime plane of the system of FIG. 1.

FIG. 2 is a block diagram 200 illustrating a runtime plane 204 of the system 100 of FIG. 1 according to an embodiment. In some examples, the runtime plane 204 is substantially the same as the runtime plane 104 described above with respect to FIG. 1. The runtime plane 204 includes a monitoring subsystem 214, a compilation subsystem 216, a communication subsystem 218, a load balancing subsystem 220, a reliability subsystem 222, and AI accelerator provider models 224.

The reliability subsystem 222 includes routines for interacting with AI workloads to ensure their reliability. In some examples, the routines include failover 232, suspend 234, resume 236, migrate 238, scale 240, checkpoint 242, and restore 244. The checkpoint 242 and restore 244 routines may be configured as the core routines and the other routines (failover 232, suspend 234, resume 236, migrate 238, and scale 240) may be configured to use checkpoint 242 and/or restore 244 routines to achieve the desired results.

The checkpoint 242 routine is configured to save the state of an AI workload as it is executed, such that the saved state can be used to continue execution of the AI workload from the saved point in time. Checkpoint 242 may be used to perform the suspend 234 routine to halt the execution of an AI workload for a period of time and/or to perform the migrate 238 routine to save the state of the AI workload such that it can be moved to another set of infrastructure resources for continued execution.

The restore 244 routine is configured to take a saved state of an AI workload as input and restore the execution of the AI workload on infrastructure resources starting at the point of the saved state. The restore 244 routine may be used to perform the resume 236 routine and/or to restore the execution of an AI workload that has been migrated to another set of infrastructure resources based on a migrate 238 routine.

The failover 232 routine is configured to checkpoint the state of an AI workload based on detection of a failure of the current infrastructure resources and to restore the AI workload on a new set of infrastructure resources, such that the AI workload recovers from the detected failure.

The scale 240 routine is configured to scale up and/or scale down the quantity, quality, and/or type of infrastructure resources being used to execute an AI workload. For instance, if additional infrastructure resources are available, an AI workload may be scaled up to make use of those additional infrastructure resources. Alternatively, if a new AI workload requires some infrastructure resources in use executing a current AI workload, the current AI workload may be scaled down to free up some resources for the new AI workload (e.g., the new AI workload may be associated with a higher priority or tier than the current AI workload).

The reliability subsystem 222 further includes a rendezvous protocol 246 configured to synchronize or otherwise enforce synchronization on AI workloads upon which the above-described routines are to be applied. For instance, if an AI workload is going to be migrated, the rendezvous protocol 246 is configured to synchronize the operations of the system such that the resources involved in the migration are not altered during the migration process. Such a rendezvous protocol 246 may include use of locking or forming a barrier such that processes that are otherwise not associated with the migration do not affect the migration inadvertently.

The AI accelerator provider models 224 are configured to enable the use of various software stacks, including third-party libraries 248 (e.g., libraries provided by tenants of the system 100) and/or first-party libraries 250 (e.g., libraries provided by the entity that manages the system 100). For instance, third-party libraries 248 may include a third-party-specific management library (ML) 252, third-party-specific multi-GPU communications library (MGCL) 254, and third-party-specific GPU library (GPUL) 256. Additionally, or alternatively, first-party libraries 250 may include a management library 264, a communication library 266, and/or a compiler toolchain 268. The runtime plane 204 enables tenants to make use of a wide variety of software stacks and associated libraries, including their own software stacks, to execute AI workloads within the described system 100 based on its extensible, flexible configuration.

Figure 3:
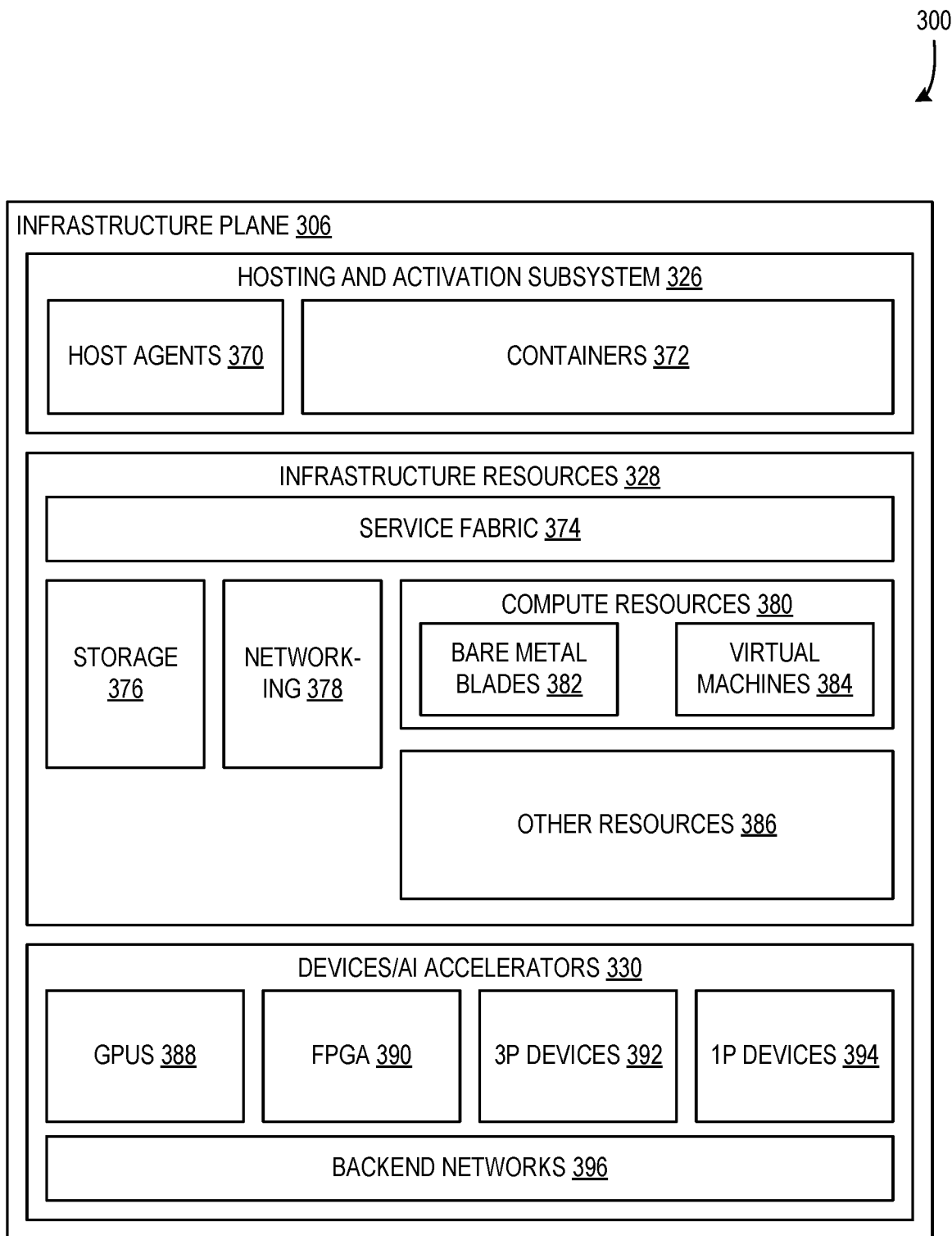
FIG. 3 is a block diagram illustrating an infrastructure plane of the system of FIG. 1.

FIG. 3 is a block diagram 300 illustrating an infrastructure plane 306 of the system 100 of FIG. 1 according to an embodiment. In some examples, the infrastructure plane 306 is substantially the same as the infrastructure plane 106 of FIG. 1, as described above. The infrastructure plane 306 includes a hosting and activation subsystem 326, infrastructure resources 328, and devices and AI accelerators 330.

The hosting and activation sub system 326 includes host agents 370 and containers 372. The host agents 370 enable and organize the hosting of AI workloads on the infrastructure resources 328. The containers 372 (e.g., copy-on-write containers) keep different AI workloads (e.g., workloads from different tenants) separate and secure from each other, even when they are being executed on the same host. A host controlled by a host agent 370 may be a device that includes a set of infrastructure resources 328 that are configured to execute an AI workload or at least a portion thereof. Thus, by separating AI workloads into containers 372, some resources of a host may be used to execute an AI workload from one tenant, while other resources of the host may be used to execute an AI workload of another tenant at the same time. The containers 372 are configured such that the two separated AI workloads are prevented from interacting in any manner while they are being executed.

The infrastructure resources 328 include a service fabric 396 interface, storage resources 376, networking resources 378, compute resources 380 which may include bare metal blades 382 (e.g., physical processing devices) and virtual machines 384, and other resources 386 (e.g., integration infrastructure resources). In some examples, the infrastructure resources 328 are primarily provided for use by the entity that is offering services of the system 100 (e.g., first-party resources), but in other examples, the infrastructure resources 328 may also include resources provided by other entities (e.g., third-party resources) such as resources owned and used by tenants of the system 100. Such integration may be enabled via the third-party libraries 248 and other configurations described above.

The devices and AI accelerators 330 include GPUs 388, FPGA devices 390, other third-party devices 392, and other first-party devices 394. The described processes may further be enabled by backend networks 374 and/or associated devices. The execution of AI workloads may uniquely benefit from the use of GPUs 388, FPGAs 390, and/or other specialized hardware. In such examples, infrastructure resources 328, such as compute resources 380, may be linked to GPUs 388, for instance, such that a compute resource 380 provides instructions to the GPU 388 for how to execute steps of the AI workload. Such execution then takes advantage of specialized architecture of the GPU 388, such as the GPU 388 having many cores enabling parallel processing of data to a significant degree beyond the capabilities of the compute resources 380.

The backend networks 374 are configured to support a variety of non-uniform backend network architectures that may be envisioned by a variety of entities that use the system, such as first-party and third-party hardware manufacturers. Such backend networks 374 may be used to provide links between disaggregated topologies of compute nodes (e.g., compute resources 380) and hardware accelerators (e.g., GPUs 388).

Figure 4:
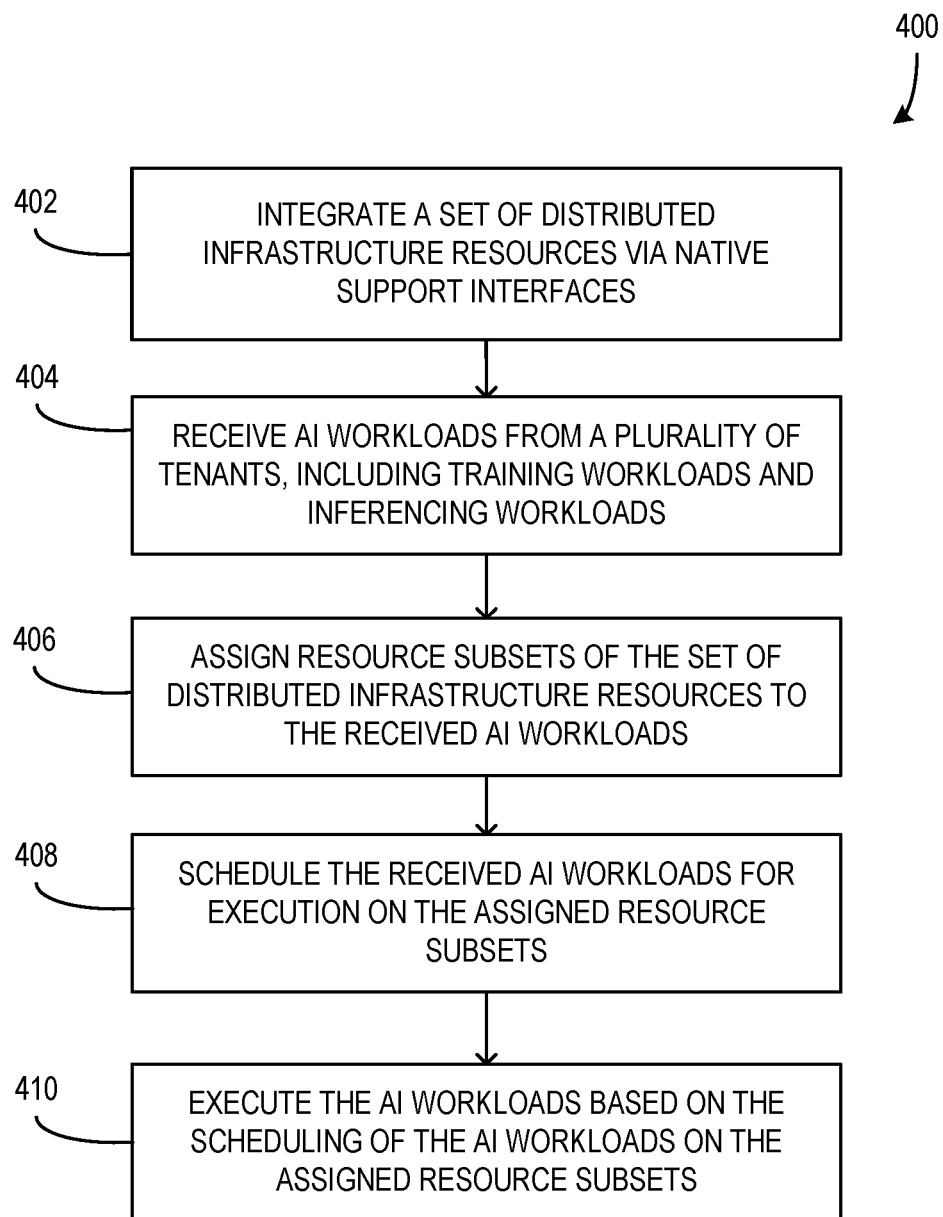
FIG. 4 is a flowchart illustrating a method for managing AI workloads in a cloud infrastructure platform.

FIG. 4 is a flowchart illustrating a method 400 for managing AI workloads in a cloud infrastructure platform according to an embodiment. In some examples, the cloud infrastructure platform of method 400 is a system such as system 100 of FIG. 1. At 402, a set of distributed infrastructure resources (e.g., hosting and activation subsystems 126, infrastructure resources 128, and/or devices/AI accelerators 130 of the infrastructure plane 106) are integrated into the cloud infrastructure platform via native support interfaces of those resources. In some examples, the native support interfaces may include interfaces and/or libraries of the providers of the resources, such as the third-party libraries 248 and first-party libraries 250 of FIG. For instance, a tenant of the could infrastructure platform may provide a subset of infrastructure resources for integration into the platform based on provided libraries, such that the tenant and/or other tenants of the platform may use those resources in execution of AI workloads.

At 404, AI workloads are received from a plurality of tenants, wherein the received AI workloads include training workloads and inferencing workloads. In some examples, the tenants provide AI workloads for execution on the platform via interfaces such as pluggable data planes 110 as described herein.

At 406, resource subsets of the distributed infrastructure resources are assigned to the received AI workloads. In some examples, the assignment of resource subsets to the AI workloads is performed by a global scheduling system 112 as described herein. Assigning the resources may include determining resource requirements of an AI workload and then identifying a subset of infrastructure resources that satisfy those requirements (e.g., an AI workload that requires the use of four GPUs in parallel may be assigned to a node of the system that has at least four GPUs).

Additionally, or alternatively, the assignment of a subset of resources to an AI workload may include rearranging of other AI workloads with respect to the subset of resources. For instance, assigning a resource subset to an AI workload may include saving a state checkpoint of an AI workload that is currently being executed on a first resource subset, migrating that AI workload to a second resource subset, restoring the saved state checkpoint of the migrated AI workload on the second resource subset, and then assigning at least a portion of the first resource subset to another AI workload. In some examples, such processes may be performed using routines of a reliability subsystem 222 as described herein.

At 408, the received AI workloads are scheduled for execution on the assigned resource subsets. In some examples, a global scheduling subsystem 112 generates a schedule for the AI workloads as described herein. Further, scheduling the execution of the AI workloads may include scheduling training workloads and inferencing workloads on the same infrastructure resources and those two types of workloads are multiplexed on those infrastructure resources (e.g., execution of a training workload is interspersed with execution of an inferencing workload on an infrastructure resource, such as a GPU).

Further, in some examples, AI workloads are associated with priorities or tiers that affect how resources are assigned and how AI workloads are scheduled to be executed on those resources. For instance, lower tier AI workloads may be more likely to be migrated to other resources to make space for higher tier AI workloads or higher tier AI workloads may be scheduled for a greater share of resource usage time than lower tier AI workloads, as described herein.

At 410, the AI workloads are executed based on the scheduling of the AI workloads on the assigned resource subsets. In some examples, the AI workloads are hosted in a hosting and activation subsystem 126 and then infrastructure resources 128 and/or devices/AI accelerators 130 are used to execute the AI workloads. For instance, assigning and executing AI workloads on resource subsets includes isolating the AI workloads from each other in secure containers, whereby AI workloads associated with different tenants are securely executed alongside each other (e.g., on resources associated with the same server).

Further, in some examples, executing AI workloads are monitored based on the performance of the cloud infrastructure platform and, based on that monitoring, the scheduling of the AI workloads is adjusted. The adjusting of the scheduling may include preempting an AI workload, migrating an AI workload, scaling up an AI workload, scaling down an AI workload, and/or load-balancing between two or more AI workloads. Such schedule adjustment may be performed by a global scheduling subsystem 112 or other component of the system 100.

Figure 5:
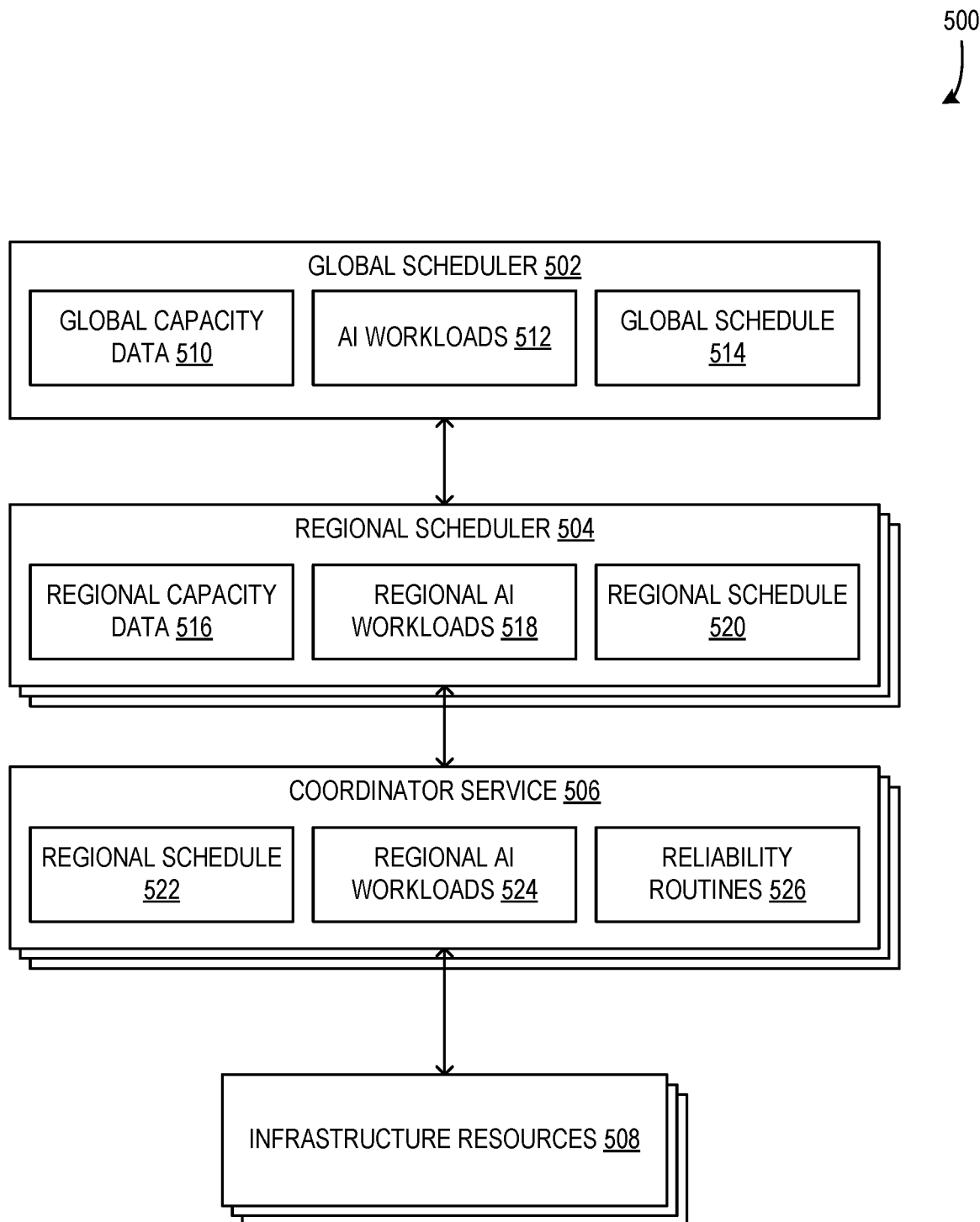
FIG. 5 is a block diagram illustrating a hierarchical scheduling subsystem configured for scheduling AI workloads.

FIG. 5 is a block diagram illustrating a hierarchical scheduling subsystem 500 configured for scheduling AI workloads 512 according to an embodiment. In some examples, the scheduling subsystem 500 is included in a system such as system 100 of FIG. 1. For instance, the scheduling subsystem 500 may be substantially the same as the global scheduling subsystem 112 of FIG. 1. The scheduling subsystem 500 includes a global scheduler 502 and multiple regional schedulers 504, coordinator services 506, and associated infrastructure resources 508. The global scheduler 502 is configured to use the global capacity data 510 (e.g., data indicating the current state of resource usage throughout the associated global infrastructure system, including resource usage in each region of the system) and AI workloads 512 to generate a global schedule 514 that schedules the AI workloads 512 to be executed on the infrastructure resources 508. The global scheduler 514 includes regional schedules 520 for each region of the system, which are then provided to the regional schedulers 504 associated with those regions (e.g., a regional scheduler 520 of a region is provided to the regional scheduler 504 associated with that particular region).

The regional schedulers 504 monitor the current regional capacity data 516 of the infrastructure resources 508 associated with the respective regions and that regional capacity data 516 is provided to the global scheduler 502 periodically or based on a pattern or a triggering event. Further, the regional schedulers 504 receive the regional AI workloads 518 associated with their regions from the global scheduler 502 from the set of AI workloads 512. The regional schedulers 504 are also configured to instruct the coordinator services 506 to execute the associated regional schedules 520 using the data of the regional AI workloads 518 (each region includes a regional scheduler 504 and a coordinator service 506).

The coordinator services 506 are configured to receive a regional schedule 522 and associated regional AI workloads 524 from an associated regional scheduler 504 and to use the reliability routines 526 (e.g., the routines of the reliability subsystem 222 of FIG. 2 as described above) to cause the regional AI workloads 524 to be executed using infrastructure resources 508 of the region based on the regional scheduler 522. For instance, a coordinator service 506 may be configured to allocate a subset of infrastructure resource 508 of the region to a regional AI workload 524 and cause that workload 524 to be executed on those allocated resources 508. Additionally, or alternatively, a coordinator service 506 may be configured to checkpoint, restore, migrate, and/or perform other reliability routines 526 to arrange the use of the infrastructure resources 508 according to the regional schedule 522.

Figure 6:
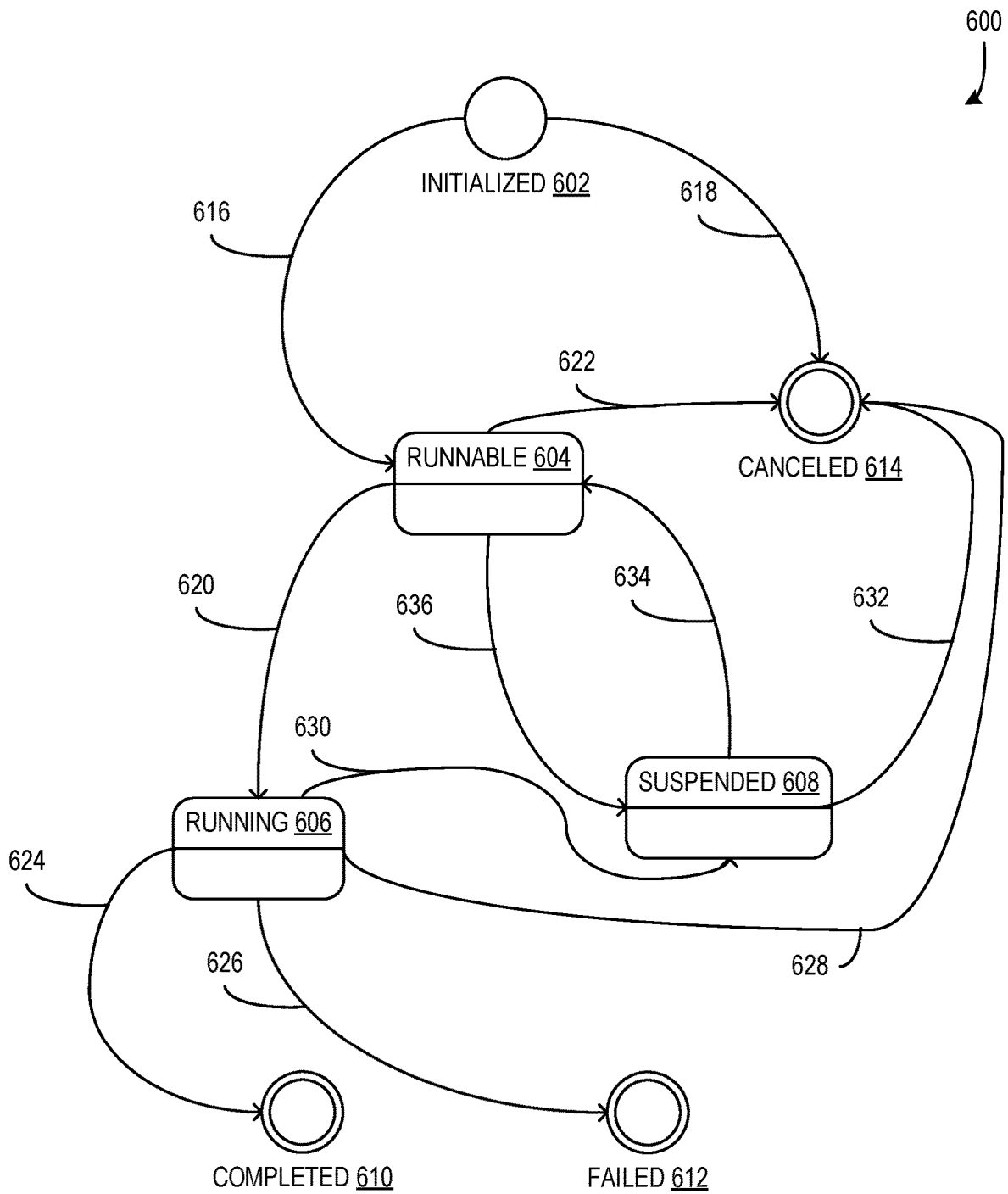
FIG. 6 is a state diagram illustrating operations of a hierarchical scheduling subsystem configured for scheduling AI workloads.

FIG. 6 is a state diagram 600 illustrating operations of a hierarchical scheduling subsystem configured for scheduling AI workloads according to an embodiment. In some examples, the state diagram 600 describes operations of a subsystem such as subsystem 500 of FIG. 5 as described herein. The state diagram 600 includes an initialized state 602 and three states associated with execution of AI workloads: a runnable state 604, a running state 606, and a suspended state 608. The state diagram 600 further includes three final states: a completed state 610, a failed state 612, and a canceled state 614.

At 616, the state goes from initialized 602 to runnable 604 when the global scheduler successfully prepares a schedule that is made available to the regional schedule for execution.

At 618, the state goes from initialized 602 to canceled 614 when a user cancels a resource which has not yet run.

At 620, the state goes from runnable 604 to running 606 when the regional scheduler successfully prepares the schedule and deploys the associated resources for execution as described herein.

At 622, the state goes from runnable 604 to canceled 614 when a user cancels a resource that was about to run (e.g., be used in the execution of a scheduled AI workload).

At 624, the state goes from running 606 to completed 610 when a resource successfully completes the execution of the scheduled AI workload.

At 626, the state goes from running 606 to failed 612 when a resource encounters a failure while running.

At 628, the state goes from running 606 to canceled 614 when a user cancels a resource that was running.

At 630, the state goes from running 606 to suspended 608 when either the scheduler or a user suspends a resource that was running (e.g., pause the execution of an AI workload).

At 632, the state goes from suspended 608 to canceled 614 when a user cancels a suspended resource.

At 634, the state goes from suspended 608 to runnable 604 when the global scheduler successfully prepares a schedule for a resource and it is now available to the regional scheduler to execute.

At 636, the state goes from runnable 604 to suspended 608 when the scheduler and/or the user suspends a resource that is ready to be run based on an available schedule.

In some examples, the running state 606 includes sub-states of executing, deleting, and faulted. Upon entering the running state 606, the regional scheduler asks the associated coordinator service to execute the resource, such that it enters an executing state. Once the requested execution is complete, the execution artifacts are deleted, such that it enters the deleting state. Once all the execution artifacts are deleted, the resource may exit the running state 606.

Alternatively, or additionally, if, in the executing state, the execution by the resource is faulted, requiring action from the regional scheduler, the resource may enter a faulted state. If the regional scheduler is able to resolve the fault, it may instruct the coordinator service to continue the execution, such that it returns to the executing state. If the regional scheduler is unable to resolve the fault, it may instruct the coordinator service to delete any execution artifacts related to the resource, such that it enters the deleting state. In other examples, more, fewer, or different sub-states of the running state 606 may be used without departing from the description.

Figure 7:
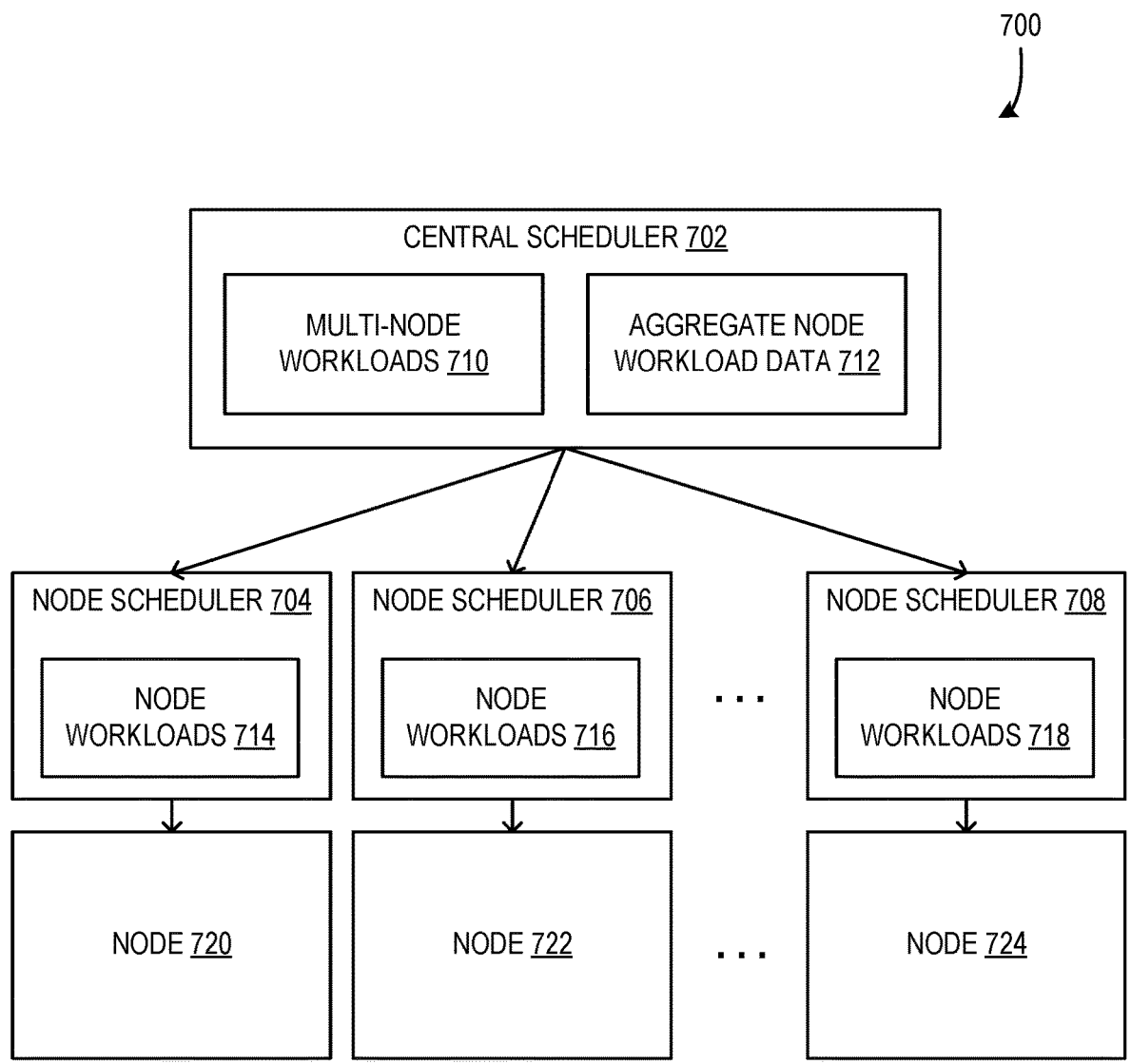
FIG. 7 is a block diagram illustrating a split scheduling subsystem configured to schedule AI workloads across multiple nodes.

FIG. 7 is a block diagram illustrating a split scheduling subsystem 700 configured to schedule AI workloads (e.g., workloads 710, 714, 716, and/or 718) across multiple nodes (e.g., nodes 704-708) according to an embodiment. In some examples, the split scheduling subsystem 700 is part of a global scheduling subsystem 112 of a system 100 as described with respect to FIG. 1. Further, the split scheduling subsystem 700 may be replicated as different instances of scheduling subsystems for multiple regions or other subdivisions of a global scheduling subsystem 112 (e.g., each region or other subdivision may include a central scheduler 702 and a plurality of node schedulers 704-708 that are associated with nodes 720-724 that include sets of infrastructure resources). Alternatively, or additionally, the central scheduler 702 may be included in a global scheduler such as global scheduler 502 while the node schedulers 704-708 may be included at a regional scheduler level, such as regional schedulers 504. Other arrangements of schedulers may also be used without departing from the description.

Further, in some examples, the nodes 720-724 referenced with respect to the split scheduling subsystem 700 may each be server devices. Alternatively, or additionally, a node may include multiple server devices, or it may be disposed on a server device with one or more other nodes. In other examples, other arrangements of nodes with respect to server devices or other hardware devices may be used without departing from the description.

In some examples, the split scheduling system 700 is configured to schedule workloads on the resources associated with nodes of a system. Workloads that can be executed on the resources of a single node (e.g., node workloads 714, 716, and 718) may be assigned by the central scheduler 702 to node schedulers 704, 706, and/or 708 that schedule those workloads on the associated nodes 720, 722, and/or 724. Workloads that require resources from multiple nodes (e.g., multi-node workloads 710) are provided to multiple node schedulers from the central scheduler 702 such that the multi-node workloads are executed substantially simultaneously across the nodes of the multiple node schedulers.

In some examples, the split scheduling system 700 includes a distributed, fair share scheduler that balances conflicting goals of efficiency and fairness in GPU clusters of nodes (and/or other infrastructure resources of the nodes 720-724) for deep learning training (DLT) and/or other workloads. The system 700 may provide performance isolation between users/tenants, enabling multiple users to share a single cluster and/or node, thus, maximizing cluster efficiency. The system 700 may further allocate cluster-wide GPU time fairly among active users.

It should be understood that, while many examples describe the splitting of workloads among GPUs specifically, in other examples, other types of infrastructure resources may be used to execute scheduled workloads without departing from the description.

In some examples, the split scheduling system 700 achieves efficiency and fairness despite cluster heterogeneity and/or node heterogeneity. Data centers host a mix of GPU generations because of the rapid pace at which newer and faster GPUs are released. As the newer generations face higher demand from users, older GPU generations suffer poor utilization, thus reducing cluster efficiency. The system 700 may profile the variable marginal utility across various jobs from newer GPUs, and transparently incentivize users to older GPUs by a novel resource trading mechanism that maximizes cluster efficiency without affecting fairness guarantees of any user.

A single shared cluster across all users is attractive for overall efficiency, but in order to be practical, such a cluster must guarantee that each user will get at least the same performance as they would have with a statically partitioned cluster. In other words, if a User A was entitled to a 20% global share of GPUs, regardless of other jobs/users running on the shared cluster, the effective performance of User A in the shared cluster must be at least the same as if User A ran on a dedicated cluster with 20% of the GPUs. If User A is unable to utilize their quota, the unused capacity must be shared across other active users, thus, maximizing cluster efficiency.

An additional dimension that complicates sharing is hardware heterogeneity, a particularly stark problem in GPU clusters. As newer GPU generations get released at a rapid pace, large clusters, over time, typically have a mix of heterogeneous GPUs. Users prefer newer generations of GPUs for their higher performance, thus leaving the older generations under-utilized. With a single shared cluster, the system 700 is configured to intelligently allocate GPUs of different generations across users, to maximize efficiency while ensuring fairness.

One of the goals of the system 700 is inter-user fairness. For simplicity, in some examples, all users have the same number of tickets. The scheduling subsystem 700 is inter-user fair if each active user receives a resource allocation of at least the total cluster GPU resources divided by the number of active users. In case an active user does not have a sufficient number of workloads or jobs to make use of their fair share, then the scheduling subsystem 700 may be configured to allocate enough resources to satisfy that user and then recursively apply the fairness definition to the remaining resources and active users. In an example, a cluster has 8 GPUs and User A and User B have been allocated four GPUs each. Thus, the allocation is inter-user fair.

In a related example, a new 2-GPU job arrives for User C. User C's fair share in this example is 8 GPUs/3 active users=2.66 GPUs (i.e., 2 GPUs+⅔rd of time on one GPU) but since the user has only one 2-GPU job, User C's fair share is 2 GPUs. After allocating User C's fair share of 2-GPUs, for inter-user fairness, the remaining 6 GPUs needs to be divided equally between User A and User B, resulting in 3 GPUs for each of them in aggregate. Now consider the various fairness options provided by current schedulers in this scenario. Some schedulers that do not have inter-user fairness as a goal and optimize their scheduling decisions based on minimizing job completion time may either allow User C's job to stay in the queue or move one of the existing jobs back to queue and schedule User C's job in its place. Alternatively, any scheduler that does not time-share GPUs will also be left with only these two options. In either case, those schedulers are not inter-user fair. Thus, these options point out the need for time-sharing of GPU resources for supporting inter-user fairness.

In some examples, it is assumed each DLT job is assigned a number of tickets which represents its share of resources. In other examples, other indicators of shares of resources may be used without departing from the description (e.g., shares of resources, percentage of resources). A goal of the system 700 may be to provide proportional share of resources based on job tickets. To achieve this goal, the system 700 may consist of three key components. First, the system 700 may be configured to use a gang-aware, split stride scheduler to schedule DLT jobs of various sizes. Second, the system 700 may be configured to use a ticket-adjusted height-based load balancer that uses migration to ensure that jobs across the cluster are balanced. Balancing workloads in conjunction with the split stride scheduler results in a fair and efficient service across a cluster of servers or nodes. Third, the system 700 may be configured to transparently handle GPU heterogeneity and implement an automated GPU trading strategy to improve efficiency across heterogeneous clusters while maintaining fairness.

In some examples, the system 700 is configured to schedule workloads/jobs using a stride-based process. A job's stride is inversely proportional to its tickets and denotes the interval between when it is scheduled. Strides are represented in virtual time units called passes. A new job's pass value is set to the minimum pass value of all jobs in the node. At each time quantum, the job with the minimum pass value is scheduled. The job's pass value is then updated by the job's stride (e.g., the job's pass value is increased by the value of the job's stride).

Further, the stride scheduling process may be extended to be gang-aware. A pseudocode example of the process is provided below.

```
Algorithm 1: Gang-Aware Stride
Data: Set of running jobs.
Result: Jobs scheduled this time-quantum.
1       begin
2           sortBy(jobs, λx : x.pass)
3           freeGPUs ← numGPUs
4           scheduled ← 0
5           i ← 1
6           while freeGPUs > 0 and i <= |jobs| do
7               job ← jobs[i]
8               if job.size <= freeGPUs then
9                   freeGPUs ← freeGPUs − job.size
10                  scheduled ← scheduled ∪ {job}
11                  job.pass ← job.pass + job.stride
12              i ← i + 1
13          return scheduled
```

The stride scheduling process or algorithm is called every time quantum and returns the jobs that are scheduled for the next time quantum out of the list of jobs available to be scheduled in the queue. Just as in classic Stride, jobs are chosen to be scheduled by the minimum pass value (line 2), but an additional check is performed to make sure they fit within the available resources (line 8). If the job fits, the job is scheduled, and its pass value is updated (line 9-11). If the job does not fit, the job is skipped, but note that the job retains it pass value; in the next time quantum, the job will have the minimum pass value and thus higher priority in being scheduled. For example, assume a 1-GPU job has minimum pass value and it gets scheduled on a 4-GPU server. Say a 4-GPU job has the next minimum pass value, but it cannot be scheduled. In gang-aware Stride, this job is skipped but its pass value is retained. This process is continued until all GPUs are allocated or there is no feasible allocation. Since the pass values of skipped jobs are not updated, the skipped jobs (e.g., the 4-GPU job) are guaranteed to have minimum pass values in the next time quantum and will get scheduled then. Thus, from a fairness perspective, the gang-aware Stride results in a service delay of at most 1-time quantum compared to the classic Stride algorithm. Finally, because of Stride's deterministic nature, the time interval required for providing the fairness guarantee in gang-aware Stride is significantly shorter than, for instance, a probabilistic gang-aware Lottery scheduling algorithm.

Now consider large jobs that require GPUs across multiple servers (e.g., multi-node workloads 710). In some examples, the gang-aware stride algorithm is run over the entire cluster. In such examples, the scheduling process will be inefficient as it will result in too many migrations (in each time quantum, jobs can be scheduled in any GPU in the cluster).

A key requirement for scheduling large jobs that span multiple servers or nodes is coordination for gang-awareness, i.e., all the GPUs across multiple servers for a given large job must be allocated in the same time quantum. On the other hand, for scalability and efficiency reasons, it is preferable for each of the servers to run the gang-aware stride algorithm independently for small jobs (e.g., node workloads 720, 722, and/or 724). To balance these conflicting goals, some examples of the system 700 uses a split stride scheduler, as depicted with respect to the central scheduler 702 and node schedulers 704-708. A central scheduler 702 maintains pass values of all large jobs (e.g., multi-node workloads 710) and one aggregate job/pass value for each of the servers (e.g., aggregate node workload data 712). The aggregate pass value for the aggregate job is inversely proportional to the cumulative number of tickets of all small jobs in that server or node. When the central scheduler 702 runs gang-aware stride, it selects the aggregate jobs and/or large jobs based on minimum pass value; in the former case, it simply instructs the respective server to run its own gang-aware stride and schedule from its local pool of small jobs (e.g., node workloads 720, 722, and 724) while in the latter case, it instructs the corresponding servers to run the large job. In this way, the system 700 achieves the coordination necessary for gang-aware scheduling of large jobs while simultaneously allowing independent servers to schedule small jobs.

The fairness provided by the split stride scheduler depends on how the job tickets are balanced across servers. If all servers are load balanced, i.e., have equal aggregate tickets, the fairness provided by the split stride scheduler can be shown to be identical to running a single cluster-level gang-aware stride scheduler (but without the inefficiency of constant migrations). Assume all the small jobs in each of the servers have 200 tickets in total and the 8-GPU job has 100 tickets. In this case, the small jobs in aggregate will get 2 out of every 3 slots while the 8-GPU job will get 1 out of every 3. Thus, balancing the load among servers is crucial for fairness and efficiency. This is discussed in further detail below.

An example technical structure in the system 700 for ensuring fair share among users and/or tenants is to distribute the ticket load across nodes as evenly as possible, and then use the split stride scheduler to schedule jobs in each node, proportional to the ticket load of each job. Formally, let $t_i$, be the tickets of the $i'^{th}$ user, and let $j_{i1}, j_{i2}, \ldots, j_{in_i}$ be the jobs of this user. Let the number of GPUs required by the job $j_{ab}$ be $r_{ab}$. Then define the ticketsPerGPU$_i$ for user i to be:

$$ticketsPerGPU_i = \frac{t_i}{\sum_{k=1}^{k=n_i} r_{ik}}, \quad (1)$$

where $n_i$ is the number of jobs of user i. ticketsPerGPU can be thought of as the number of tickets the user will be utilizing per GPU for its workload.

The ticket load per GPU on the $i'^{th}$ node is defined to be:

$$ticketLoadPerGPU_l = \frac{\sum_{j_{ab} \in A_l} r_{ab} * ticketsPerGPU_a}{g_l}, \quad (2)$$

where $g_l$ is the number of GPUs on node l, and $A_l$ is the set of jobs scheduled on node l. ticketLoadPerGPU can be thought of as the number of tickets each GPU on a particular node has to service. In some examples, the system 700 is configured to provide an equitable distribution of ticketLoadPerGPU across all nodes, such that it will ensure that all nodes service similar number of tickets. Then fair distribution (in proportion of tickets) of GPU compute across jobs can be achieved, by ensuring that each node locally does a fair scheduling proportional to the local tickets.

For equitable distribution of load across all nodes, a new job is assigned to the node with minimum value of ticket-LoadPerGPU. Note that since the new job will change the ticketsPerGPU (eq 1), the ticketLoadPerGPU for each node as per the updated ticketsPerGPU is recalculated, and then the node with the least value is chosen.

For scheduling jobs within a node, the tickets to be utilized for each job are calculated. For a job $j_{ik}$, this is simply given by:

$$jobTickets_{ik} = ticketsPerGPU_i * r_{ik}, \quad (3)$$

where i is the job's user and $r_{ik}$ is the number of GPUs required by the job. To ensure fair share locally, the scheduler (e.g., node schedulers 704-708) then assigns time quantum to each job proportional to its jobTickets using the split gang-aware stride scheduling algorithm described in the previous section.

Note that, due to a burst of job departures, the load of the servers may get imbalanced. In some examples, the system 700 is configured to fix such imbalances using job/workload migration as described herein. Also, for simplicity, examples have assumed that each user has enough jobs to completely utilize their share of GPUs. However, it may be that a user submits much fewer jobs than needed to utilize the user's full share. In this case, the system 700 may satisfy the needs of such users first, remove them from the list, recalculate the weights for the remaining users and iterate to determine each subsequent user's fair share. In this way, users with sufficient load get a bonus share from users who under-utilize their shares.

In order to implement this iteration in an optimized manner, a process may be used to calculate each users' effective tickets and then follow the above algorithm. Finally, care must be taken during placement as well as migration to ensure that jobs are "packed" in servers as far as possible to avoid non-work conserving scenarios, as discussed in the next section.

A key aspect determining the efficiency of a scheduler is whether the scheduler is work-conserving, i.e., determining whether the scheduler leaves resources idle when there are active jobs that could be scheduled on them. The combined requirement of being fair while also handling variable-sized jobs, makes it challenging for the scheduler to be work-conserving in all scenarios. For example, consider the case where only one job each of 1-GPU and 4-GPU sizes are active on a 4-GPU server, each with equal number of tickets. To ensure fair share, three GPUs may go idle in every alternate time interval when the 1-GPU job is being executed.

In some examples, the system 700 is configured to address the apparent conflict between fairness and efficiency by leveraging two domain-specific customizations. First, the system 700 may leverage the mechanism to migrate a job on-demand at a high efficiency that allows jobs to be moved across servers. Second, the specific workload of DLT jobs in large clusters is particularly well-suited to a migration policy that performs intelligent packing of jobs to avoid such pathological scenarios.

So far, in the described examples of the scheduler design, GPUs/resources used to execute workloads/jobs are assumed to be homogeneous. However, in some scenarios, GPUs or other resources may be heterogeneous (e.g., a set of GPUs may include a variety of different types of GPUs with differing performance attributes). In some examples, the system 700 is configured to handle GPU heterogeneity in transparent way to users and/or tenants. This has two components, first, allocation of jobs to GPUs of a particular model transparently and second, allowing two users to automatically trade their assigned GPUs to benefit each other.

Consider a cluster with a mix of V100s and K80s. Based on a given user's tickets, in an example, a fair-share allocation for the user is 4 V100 GPUs and 4 K80s. The table below includes example details about relative performance of V100s and K80s with different types of workloads:

TABLE 1

| Type | K80 | V100 | Speedup | Aggregate |
|---|---|---|---|---|
| Inter-User Fair Allocation | | | | |
| A | 20 | 4 | 1.25 | 25 |
| B | 20 | 4 | 5 | 40 |
| C | 20 | 4 | 6.25 | 45 |
| Inter-User Fair Allocation with Trading | | | | |
| A | 40 | 0 | 1.25 | 40 |
| B | 20 | 4 | 5 | 40 |
| C | 0 | 8 | 6.25 | 50 |

If a user wants a particular GPU model, the user can specify that along with the job and scheduler simply 'pins' the job to that GPU and the rest of the section is moot for this job. However, in other examples, most users will not want to pin GPUs, since, as described below, automated trading allows users to get higher throughput than pinning. In this case, when a job for the given user arrives, where is this job allocated—on a V100 or a K80?

In some examples, the system 700 is configured to assume a strict priority order among various GPU models, with the newer GPUs like V100 having higher priority over older GPUs like K80. If a new job arrives, the scheduler automatically picks the newer GPU (V100), assigns the job there and profiles its performance. If the user is performing hyper-parameter tuning, many more similar jobs will be submitted by the user. For instance, if the user submits 8 jobs, these jobs will all be placed on the V100 and time-shared. When jobs are time-shared and scheduler estimates that the job's memory requirements will fit on the older K80, the scheduler may transparently migrate the job to a K80 and monitor and/or profile its performance there. Then, the scheduler may be configured to compare the job's performance on V100 and on K80 and decide how best to optimize performance for the user.

For example, say the job is a type A job (e.g., variational autoencoding (VAE)) that gets 1.25× speedup on the V100 compared to the K80 (see the example statistics of Table 1). In this case, since these jobs are being time-shared on the V100 currently, the scheduler transparently migrates the timeshared jobs to the K80 so that four jobs run fully on the V100 while four jobs run on the K80. In contrast, if the job is a type B job (e.g., deep convolutional generative adversarial networks (DCGAN)) that gets a 5× speedup on the V100, the example system will continue to time-share the eight jobs on the V100 so that these jobs proceed on average at 2.5× the rate. Thus, the system 700 may be configured to automatically choose the GPU model that maximizes each job's performance.

Once the jobs have been allocated their GPUs, in some examples, the system 700 is configured to support GPU trading among users to further improve efficiency. To support automated GPU trading, such an example system utilizes a key observation from the example statistics of Table 1: different types of DLT jobs have variable marginal utility from newer GPU generations (e.g., each of the different types of jobs of Table 1, A jobs, B jobs, and C jobs, have different "Speedup" factors representing the degree to which using a V100 speeds up a job in comparison to the same job being executed on a K80).

One of the unique aspects of DLT jobs is the need to train jobs using a variety of hyper-parameters, in order to identify the best accuracy. Thus, the users submit what is called a multi-job, which is typically 10-100 copies of a DLT job, each with different hyper-parameters such as learning rate, weight decay, etc. Crucially, the job performance characteristics are identical across these large number of jobs from a given user. In such scenarios, trading as described herein can be used to increase application throughput of both users involved in a trade.

Consider a cluster with 60 K80s and 12 V100s, and three active users that are scheduling three types of jobs respectively: A jobs, B jobs, and C jobs (see Table 1). In some examples, the jobs may be VAE jobs, DCGAN jobs, and residual neural network (ResNext) jobs, respectively. Assume that each of the users have submitted tens of jobs to the cluster as part of their hyper-parameter tuning experiments so that the cluster is fully utilized. If the scheduler simply provided fair share, each user will be allocated 20 K80s and 4 V100s (see the top portion of Table 1). In terms of performance, the user running A jobs will see a speedup of 25% when running in V100s, for an aggregate performance of 20+4*1.25=25 normalized K80 GPUs. Similarly, the user running B jobs will see a speedup of 5× from V100 for an aggregate performance of 20+4*5=40 normalized K80 GPUs. Finally, the user running C jobs will see a speedup of 6.25× from V100 for an aggregate performance of 20+4*6.25=45 normalized K80 GPUs.

Since users see varying marginal utility of using a V100 as compared to a K80, there is scope for improving overall efficiency using trading. Consider user A (e.g., the user executing type A jobs) who benefits the least (125% faster) from a V100 compared to user C who benefits the most (625% faster). A V100 allocated to user C (e.g., the user executing type C jobs) is 5 times more efficient (in terms of rate of job progress) than a V100 allocated to user A. Thus, it makes sense to trade K80s of user C to user A in exchange for V100s to maximize efficiency.

In some examples, a simple solution is to trade 1.25 K80s from User C for 1 V100 from User A. In this case, all the efficiency gains (trade surplus of 5× per V100) accrue to User C. However, this solution may be susceptible to gaming by shrewd users. Consider User B (e.g., the user executing type B jobs) who modifies the job to check for GPU architecture the job executes on and simply slows down its performance when running on K80 so that the overall speedup of the user's model is 6.5× on V100 compared to K80. User B would then win the trade and recoup sufficient gains using the V100 to compensate for the slowdown in K80s. Thus, the trade price must be carefully chosen to avoid such gaming. Another solution is to trade 6.25 K80s from User C for 1 V100 from user A. In this case, the trade surplus goes entirely to User A and User C is not incentivized to trade.

In some examples, the system 700 is configured to address this pricing dilemma by using second-price auction mechanisms. Specifically, the system 700 may execute the trade at the second highest price, i.e., User C trades 5 K80s for each 1 V100 from User A, where the 5× is determined by second price (the speedup of User B; if there is no such user, the surplus is split equally). Second-price auction has properties such as incentive-compatibility, which implies that every user can achieve their best outcome by bidding their true preferences. Under this scenario, artificially speeding up or slowing down their jobs will not help users. Further, both users of the trade benefit from some of the surplus efficiency gains.

Vickrey auctions (the second-price auction mechanism described above) have some weaknesses as well. In particular, Vickrey auctions are not collusion proof. If all the bidders in an auction reveal their prices to each other, they can lower their valuations. However, in the described systems and methods, collusion is not a major concern as the auction is being used to mainly distribute the performance gains from the trade; each user in the trade is still guaranteed to get their fair share.

Table 1 shows the allocation at the end of four such trades in the lower portion of the table. User A has 40 K80s for an aggregate performance of 40 (compared to 25 earlier) while User C has 8 V100s for an aggregate performance of 50 (compared to 45 earlier). Thus, both users achieve better aggregate performance from the trade and overall efficiency of the cluster is maximized while ensuring inter-user fairness.

In some examples, the system 700 is configured to use profiling to continuously maintain job performance statistics such as mini-batch progress rate. For jobs that may change their performance behavior during the training process, the system 700 may be configured to detect such a change and undo the trades if necessary. Additionally, or alternatively, while trading in the examples provided is for hyper-parameters jobs where the jobs of a given user are homogeneous, in other examples, trading can be used for heterogeneous jobs without departing from the description.

An example process of allocating a job in the system 700 is provided in pseudocode below. The time quantum may be set to, for instance, one or two minutes to ensure that the overhead of GPU context switching is under 1%.

| Algorithm 2: Allocating a Job |
| --- |
| Data: Set of users, gpus, servers, and jobs. |
| Result: The job, associated tickets, and allocation. |
| 1    begin |
| 2      user ← minBy(users, $\lambda$u : u.tickets) |
| 3      job ← maxBy(jobs[user], $\lambda$j : j.priority) |
| 4      if job.per f, $\emptyset$ then |
| 5        $gpu \leftarrow minBy\left(gpus, \lambda g : \frac{job.per\ f[g]}{user.tickets[g]}\right)$ |
| 6      else |
| 7        gpu ← maxBy(gpus, $\lambda$g : g.rank) |
| 8      tickets user.tickets[gpu] * job.size |
| 9      $k \leftarrow \left\lceil \frac{job.size}{numGPUs\ PerServer} \right\rceil$ |
| 10     sortBy(servers[gpu], $\lambda$s : s.load) |
| 11     allocation ← servers[gpu] [1 . . . k] |
| 12     return job, allocation, tickets |

In some examples, the system 700 is configured to maintain updated values for the three key variables depicted in equations 1-3 (tickets per GPU, ticket load per GPU, and job tickets) to make its scheduling decisions. Algorithm 2 shows how a job is first allocated to a node. In examples using algorithm 2, the scheduling subsystem 700 maintains a job queue for each user. The scheduling subsystem 700 first finds the user using the least resources so far based on ticketsPerGPU (line 2) and picks one job from that user based on the job's priority/arrival time for scheduling (high priority and jobs which were submitted earliest are preferred). If the job has been seen before (say, part of a multi-job) and the system 700 has the job's profile information available for different GPU models, then system 700 picks the fastest GPU model (line 5, 6) as discussed herein. Note that job.per f [g] refers to the mini-batch duration of the job on GPU g. Otherwise, it simply picks the latest GPU model in line 8 (e.g., V100). Once the GPU model is chosen, the actual node to schedule the job is based on the nodes with the lowest ticketLoadPerGPU (line 11, 12). The scheduler computes jobTickets, the number of tickets for the job (line 9) and then schedules the job on the chosen nodes. The split gang-aware stride scheduler uses the jobTickets to then schedule the job at each time quantum and ensure its fair-share. It should be understood that the process described in this paragraph is exemplary and that, in other examples, other processes or algorithms may be used to allocate a job in the system 700 without departing from the description.

In some examples, the system 700 is configured to use job profiling to determine the speed-up of each job on various GPU models in the system. Job profiling statistics are collected opportunistically as the jobs are scheduled and thus incur no additional overhead. For example, when a user submits their first job, it is scheduled on the fastest available GPU (e.g., V100). For every time quantum, the job is profiled to determine its average time taken per mini-batch and this data is collected by the scheduling subsystem 700. As the user submits more jobs, the jobs are scheduled on the V100s until the user exhausts their V100 allocation (based on their tickets). The next job the user submits is scheduled on the second fastest GPU (e.g., P100). The job is then profiled on the new GPU. If the user is performing hyperparameter tuning, the jobs will be similar and, thus, the scheduling subsystem 700 can determine the speedup of the job on a V100 over a P100. Thus, as jobs arrive and are scheduled on different GPU models, the profiled value gets updated to the average of most recent statistics to reflect the current speedups. By maintaining average of recent statistics, in such examples, the system 700 can detect and adapt to jobs that may change their performance behavior in the middle of training.

In some examples, the system 700 is configured to evaluate job migration options every time quantum. In a homogeneous cluster, migration may be used only for load balancing. Jobs from the highest loaded node or server may be migrated to the least loaded node or server if the difference in their ticketLoadPerGPU is above a threshold. In a heterogeneous cluster, migration may be used for improving job performance and efficiency through trading. In such examples, the scheduling subsystem 700 looks at the average progress rate and tokensPerGPU of each user's jobs on each GPU model and calculates effective performance (mini-batch rate divided by tokensPerGPU). Based on the profiled information, if the user will benefit from having their jobs migrated from one GPU model to another and if the resulting improvement is greater than a threshold, then the scheduler adds this user to the candidate migration list. Among all such (user, source GPU model, destination GPU model) tuples, the scheduler picks the one that will gain the most and migrates one job to the node(s) with the lowest ticketLoadPerGPU of the destination GPU model.

In some examples, the system 700 is configured to evaluate GPU trading options every time quantum. For each (fast GPU model, slow GPU model) tuple (e.g., V100, K80), the scheduling subsystem 700 may find a "seller" (the user with the fastest speed up on fast GPU relative to slow GPU) and a "buyer" (the user with the least speedup). The trade price is obtained by using the second highest bid, i.e., if the user with second fastest speedup has speedup r, then r slow GPUs are traded for one fast GPU between the buyer and seller, and then jobs for the seller and buyer are migrated to the traded GPUs. Each trade results in increased efficiency corresponding to the difference between the speedups of the buyer and the seller while the efficiency gains are distributed to both the buyer and seller based on the second price. Further, during both job arrivals and departures, a trading check is performed to see if some of the trades must be undone (e.g., a new user has arrived, and the traded GPUs are needed for fair allocation).

In some examples, the described auctioning run time for trading GPUs or other resources is O(number of users) and the allocation run time is O(number of users+number of jobs). Thus, scaling with the number of users/jobs is not computationally challenging in such examples of the system 700.

In some examples, the system 700 is configured to use KUBERNETES as a cluster manager with a custom scheduler that allocates jobs to nodes. Jobs may be submitted as DOCKER containers. Other tools and/or elements of the system 700 may include SCALA code, the AKKA Actors library for concurrency, and/or GRPC Remote Procedure Calls (GRPC) for performing remote procedure calls. In other examples, more, fewer, or different tools and/or elements may be used to implement the system 700 without departing from the description.

In some examples, a manager of the system 700 is configured to expose a REST API and a GRPC endpoint for the clients to connect to the scheduling subsystem 700. The system 700 may make decisions like placement, migration, ticket allocation, management of bonus tokens, trading, etc. There may be one global executor for performing gang scheduling of multi-server jobs and one local executor for each server in the cluster and together they are responsible for running the jobs on servers in proportion to the tickets allocated by the scheduler. Finally, the client, which runs inside the container alongside the job, also exposes a GRPC endpoint, and is responsible for receiving commands from the executor to perform operations like suspend/resume, checkpoint/migrate, report job metadata, and report the status of the running jobs.

In some examples, a key mechanism utilized by the system 700 is the ability to migrate jobs between nodes. In order to migrate jobs, checkpoint jobs may be checkpointed on-demand and then these jobs may be resumed on a different node. Some DLT jobs are written with checkpoint capability so that they can resume from a previous checkpoint if it exists, but few jobs have such checkpoint functionality implemented. Moreover, even among those DLT jobs that use checkpoint, they typically only checkpoint every epoch. An epoch can last several hours or more. While such checkpoints are useful to guard against occasional server failures, in some examples, the system 700 requires much more fine-grained checkpointing for fairness and efficiency. Thus, the system 700 may be configured to implement an automatic, on-demand checkpoint mechanism.

In some examples, to support job migration, the system 700 is configured to have modified PYTORCH and TENSORFLOW frameworks. Such implementations can handle unmodified user code and require only surgical changes to both the frameworks. Although generic process migration tools such as checkpointing libraries exist, they cannot handle processes with GPU state. In some examples of the system 700, a proxy process is forked from the main process and all GPU calls made by the process are intercepted and directed via the proxy process. In this way, the address space of the main process remains CPU only and can be easily checkpointed via checkpointing libraries. The proxy process is configured and responsible for 1) translating all GPU handles such as stream, context, etc. 2) keeping a log of all state changing GPU calls, so that they can be replayed upon a restore, and 3) memory management of GPU memory. A memory manager of the system 700, in some examples, maps the virtual address space to the physical GPU address space in a consistent manner across migration, so that pointers to GPU memory remain completely transparent for the parent process. Upon checkpoint, the proxy's memory manager copies the GPU state to the parent process' CPU memory and dies. The parent process can then be migrated using checkpointing libraries. Upon performing a restore process, the proxy process replays the log of state changing GPU calls and copies the GPU memory back. All communication between proxy and the parent process may be handled via shared memory with negligible overhead, in some examples. The proxy implementation remains unchanged between PYTORCH and TENSORFLOW and requires only minimal modifications to the actual frameworks. In other examples of the system 700, other methods of migrating jobs may be used without departing from the description.

In some examples, the system 700 is configured to optimize the migration performance overhead by implementing a three-phase context switch called the suspend-preload-resume. When the framework is notified to suspend, it completes it within about 100 ms by copying the minimal data in the GPU (proxy process) at the end of a mini batch of training to the CPU memory (parent process), thus, allowing the scheduler to run another job on the GPU. If the job needs to be migrated across servers, then the scheduler performs a checkpoint on the job container and restores it on the target server. The framework then waits for a preload notification. When it receives the preload, it sets up the state on the new GPU(s) by replaying the log of all stateful operations but does not resume. Thus, preload hides the 5 second latency for initialization of the GPU context. Finally, when the framework is notified to resume, it copies the data back to GPU memory, which takes about 100 ms, and quickly resumes the GPU computation. Thus, migration mostly occurs in the background while other jobs utilize the GPU. In other examples of the system 700, other methods of optimizing the migration of jobs may be used without departing from the description.

Figure 8:
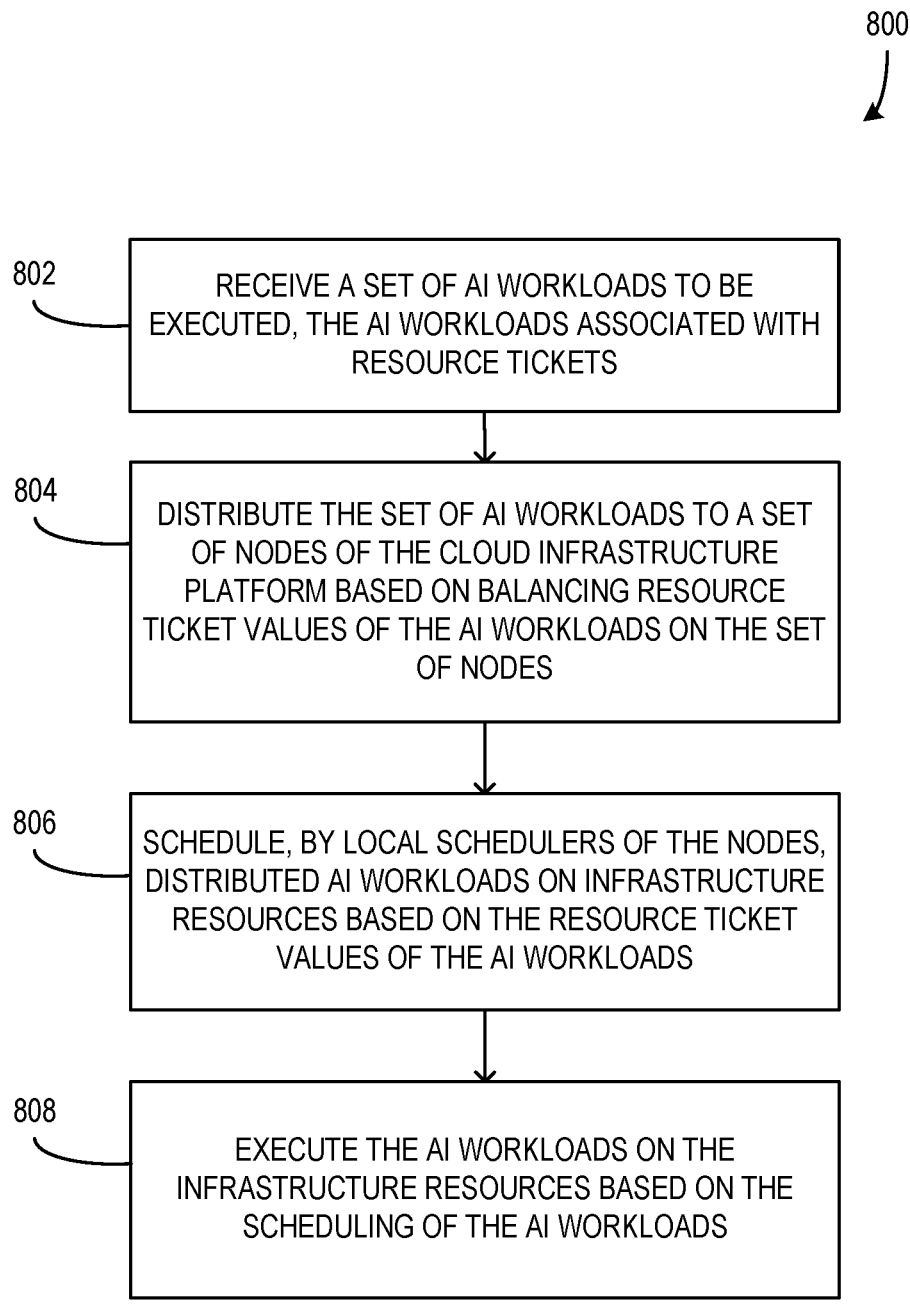
FIG. 8 is a flowchart illustrating a method for scheduling execution of AI workloads in a cloud infrastructure platform using a split scheduling subsystem.

FIG. 8 is a flowchart illustrating a method for scheduling execution of AI workloads in a cloud infrastructure platform using a split scheduling subsystem according to an embodiment. In some examples, the method 800 is performed by a scheduling subsystem such as system 700 of FIG. 7. At 802, a set of AI workloads to be executed is received by a split scheduling subsystem of the cloud infrastructure platform. Each AI workload the set of AI workloads is associated with a resource ticket value indicative of a share of resources with which that AI workload is to be executed. The split schedule subsystem may include a global scheduler and multiple regional schedulers as described herein at least with respect to FIGS. 5 and 7.

At 804, the set of AI workloads is distributed to a set of nodes of the cloud infrastructure platform in a balanced manner (e.g., based on balancing resource ticket values of the AI workloads on the set of nodes). The distribution of the AI workloads to the set of nodes may be performed by the global scheduler of the cloud infrastructure platform. In some examples, balancing resource ticket values of the AI workloads on the set of nodes includes distributing each AI workload to a compatible node with the current lowest resource ticket value (e.g., a total number of tickets associated with the AI workloads currently assigned to the node) and then updating that node's resource ticket value, whereby the resource ticket values of the set of nodes tend to remain close to balanced.

At 806, local schedulers of the nodes schedule the distributed AI workloads on infrastructure resources based on the resource ticket values of the AI workloads. In some examples, scheduling AI workloads based on resource ticket values includes multiplexing multiple AI workloads on infrastructure resources proportionally based on the resource ticket values of those multiple AI workloads. Additionally, or alternatively, multi-node AI workloads may be scheduled on a subset of the nodes based on balancing sums of the resource tickets values of AI workloads distributed to the subset of nodes, wherein the multi-node AI workloads are scheduled to be executed simultaneously on the subset of nodes. Further, scheduling multi-node AI workloads by the global scheduler and scheduling AI workloads distributed to the nodes by local schedulers includes scheduling AI workloads using a stride mechanism for each time quantum during execution of the AI workloads.

Additionally, or alternatively, scheduling the AI workloads may include identifying an AI workload that is currently being executed using the infrastructure resources of the first node and migrating the identified AI workload to another node, whereby infrastructure resources of the first node are freed for use in executing the scheduled AI workloads. Further, identifying the AI workloads may include identifying the AI workload based on the AI workload being associated with a lower priority tier than at least one AI workload of the subset of AI workload.

At 808, based on scheduling the AI workloads on the nodes, coordinator services of the nodes execute the AI workloads on the infrastructure resources of the nodes as described herein.

In some examples, the method 800 further includes monitoring performance of the AI workloads using the infrastructure resources based on heterogeneous types of infrastructure resources and, based on the monitoring indicating a difference in performance between a first AI workload and a second AI workload based on the heterogeneous types of infrastructure resources, trading infrastructure resource between the first AI workload and the second AI workload to balance out the indicated difference in performance. Additionally, trading infrastructure resources between the first and second AI workloads includes determining an exchange rate for trading a first type of infrastructure resource for a second type of infrastructure resource, wherein the determined exchange rate benefits the first AI workload and the second AI workload and exchanging a first quantity of the first type of infrastructure resource associated with the first AI workload to the second AI workload for a second quantity of the second type of infrastructure resource associated with the second AI workload to the first AI workload, wherein the first quantity and second quantity are based on the determined exchange rate. In some examples, the determined exchange rate is based on a second-price auction mechanism as described herein.

Exemplary Operating Environment

Figure 9:
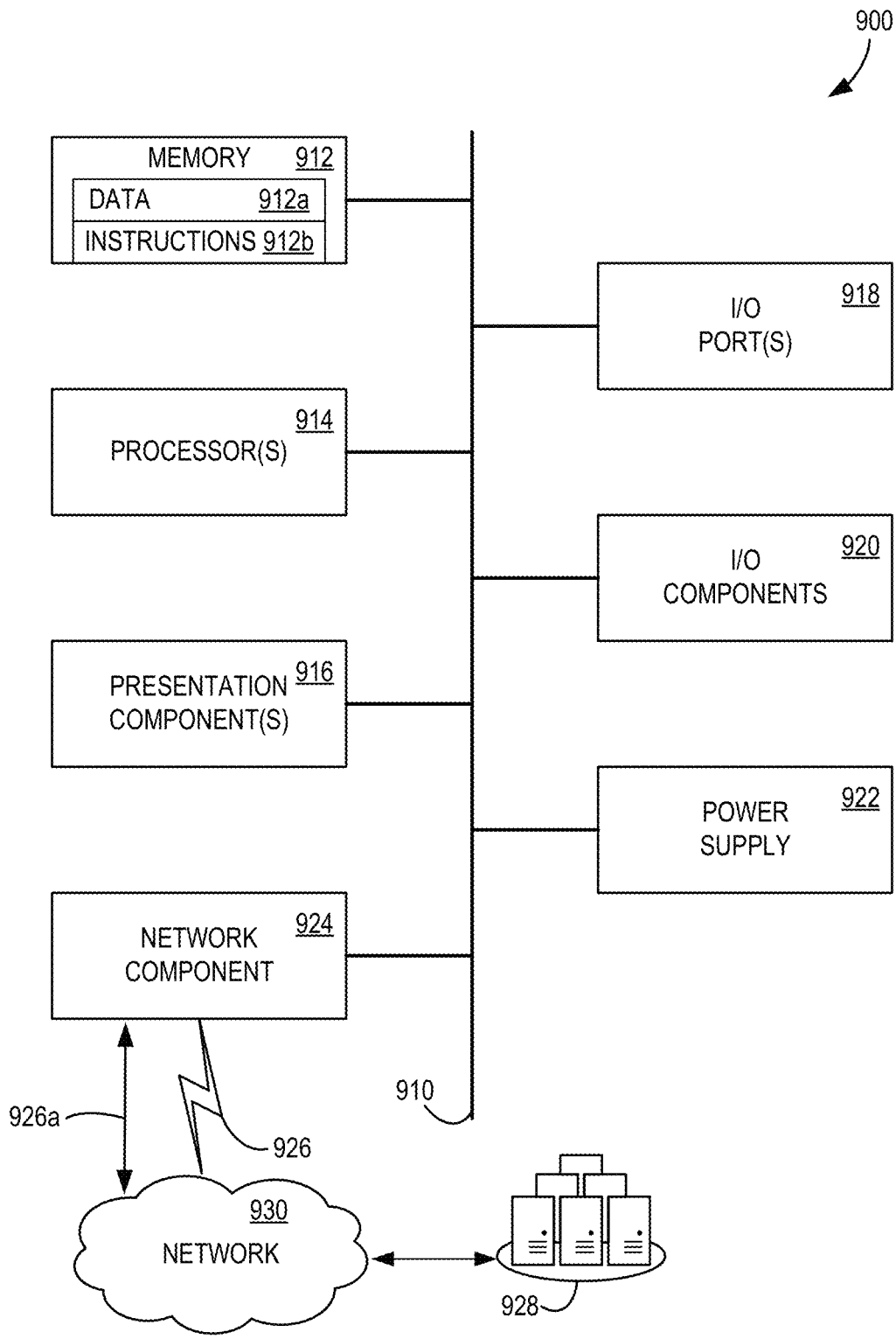
FIG. 9 illustrates a computing apparatus according to an embodiment as a functional block diagram.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. For example, memory 912 is distributed across multiple devices, and processor(s) 914 is housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by the computing device 900. Memory 912 may be internal to the computing device 900 (as shown in FIG. 9), external to the computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 900. Additionally, or alternatively, the memory 912 may be distributed across multiple computing devices 900, for example, in a virtualized environment in which instruction processing is carried out on multiple devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations are performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

The computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), BLUETOOTH branded communications, or the like), or a combination thereof. Network component 924 communicates over wireless communication link 926 and/or a wired communication link 926a to a cloud resource 928 across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for scheduling execution of AI workloads in a cloud infrastructure platform comprises: at least one processor of the cloud infrastructure platform, wherein the at least one processor includes at least one of the following: a central processing unit (CPU), a graphics processing unit (GPU), and a hardware accelerator; and at least one memory of the cloud infrastructure platform comprising computer program code, the at least one memory and the computer program code configured to, with the at least one processor, cause the at least one processor to: receive, by a scheduler, a set of AI workloads to be executed, wherein each AI workload of the set of AI workloads is associated with a priority tier of a set of priority tiers indicative of a preemption priority with which that AI workload is associated while being executed; schedule, by the scheduler, the set of AI workloads to a set of nodes of the cloud infrastructure platform, wherein each node of the set of nodes includes infrastructure resources for use in executing AI workloads, and wherein the set of AI workloads is distributed to the set of nodes based at least on priority tiers of the AI workloads on each node of the set of nodes; and based on scheduling the set of AI workloads distributed to the set of nodes, execute, by a coordinator service of the scheduler, the set of AI workloads on the infrastructure resources of the set of nodes.

An example computerized method for scheduling execution of AI workloads in a cloud infrastructure platform comprises: receiving, by a processor of a global scheduler, a set of AI workloads to be executed, wherein each AI workload of the set of AI workloads is associated with a resource ticket value indicative of a share of resources with which that AI workload is to be executed; distributing, by the processor of the global scheduler, the set of AI workloads to a set of nodes of the cloud infrastructure platform, wherein each node of the set of nodes includes infrastructure resources for use in executing AI workloads, and wherein the set of AI workloads are distributed to the set of nodes based on balancing resource ticket values of the AI workloads on each node of the set of nodes; scheduling, by a processor of a local scheduler of a first node of the set of nodes, a subset of AI workloads of the set of AI workloads distributed to the first node to be executed on the infrastructure resources of the first node, wherein the scheduling of the subset of AI workloads is based on the resource ticket values associated with the subset of AI workloads; and based on scheduling the subset of AI workloads distributed to the first node, executing, by a coordinator service of the local scheduler of the first node, the subset of AI workloads on the infrastructure resources of the first node.

One or more computer storage media have computer-executable instructions for scheduling execution of AI workloads in a cloud infrastructure platform, upon execution by a processor, causes the processor to at least: receive, by a global scheduler, a set of AI workloads to be executed, wherein each AI workload of the set of AI workloads is associated with a resource ticket value indicative of a share of resources with which that AI workload is to be executed; distribute, by the global scheduler, the set of AI workloads to a set of nodes of the cloud infrastructure platform, wherein each node of the set of nodes includes infrastructure resources for use in executing AI workloads, and wherein the set of AI workloads are distributed to the set of nodes based on balancing resource ticket values of the AI workloads on each node of the set of nodes; schedule, by a local scheduler of a first node of the set of nodes, a subset of AI workloads of the set of AI workloads distributed to the first node to be executed on the infrastructure resources of the first node, wherein the scheduling of the subset of AI workloads is based on the resource ticket values associated with the subset of AI workloads; and based on scheduling the subset of AI workloads distributed to the first node, execute, by a coordinator service of the local scheduler of the first node, the subset of AI workloads on the infrastructure resources of the first node.

Alternatively, or in addition to the other examples described herein, examples include any combination of the following:

wherein the set of priority tiers include at least a first priority tier and a second priority tier, and the first priority tier is higher priority than the second priority tier; and wherein AI workloads of the first priority tier have priority over AI workloads in the second priority tier based on at least one of the following: preemption frequency, scale-up priority, and locality priority.

wherein the at least one memory and the computer program code is configured to, with the at least one processor, further cause the at least one processor to: schedule, by the scheduler, a multi-node AI workload associated with the first priority tier on a subset of nodes of the set of nodes, wherein scheduling the multi-node AI workload includes preempting at least one AI workload associated with the second priority tier that is lower priority than the first priority tier on the subset of nodes.

wherein the at least one memory and the computer program code is configured to, with the at least one processor, further cause the at least one processor to: monitor performance of the set of AI workloads being executed using the infrastructure resources; based on monitoring performance of the set of AI workloads, determine, for each AI workload, a dynamic preemption score indicative of a relative likelihood that the AI workload will be preempted, wherein the dynamic preemption score is based on at least one performance threshold requirement of the priority tier with which the AI workload is associated; based on determining that an AI workload will be preempted, identify an AI workload for preemption based on the dynamic preemption score of the AI workload, wherein the identified AI workload has the dynamic preemption score indicative of a highest likelihood of preemption of all dynamic preemption scores of the set of AI workloads; and preempt the identified AI workload.

wherein the at least one memory and the computer program code is configured to, with the at least one processor, further cause the at least one processor to: identify a set of spare infrastructure resources for distribution to the set of AI workloads; identify a first subset of AI workloads associated with a high priority tier of the set of AI workloads; distribute a first subset of infrastructure resources of the set of spare infrastructure resources to the first subset of AI workloads based on a scale-up priority requirement of the high priority tier; identify a second subset of AI workloads associated with a standard priority tier of the set of AI workloads;

distribute a second subset of infrastructure resources of the set of spare infrastructure resources to the second subset of AI workloads based on a scale-up priority requirement of the standard priority tier, wherein the second subset of infrastructure resources is smaller than the first subset of infrastructure resources;

identify a third subset of AI workloads associated with a low priority tier of the set of AI workloads; distribute a third subset of infrastructure resources of the set of spare infrastructure resources to the third subset of AI workloads based at least on a scale-up priority requirement of the low priority tier, wherein the third subset of infrastructure resources is smaller than the second subset of infrastructure resources;

wherein the set of AI workloads includes a set of suspended AI workloads that are suspended for lack of infrastructure resources; and wherein a subset of the set of suspended AI workloads are resumed based on distributing the set of spare infrastructure resources.

wherein scheduling the set of AI workloads on the infrastructure resources of the set of nodes includes: identifying a first AI workload that is currently being executed using the infrastructure resources of a first node, wherein the first AI workload is associated with a lower priority tier than a second AI workload of the set of AI workloads; and migrating the first AI workload to a second node, whereby infrastructure resources of the first node are freed for use in executing the second AI workload of the set of AI workloads.

wherein priority tiers with which the set of AI workloads are associated include performance requirements based on a throughput fraction value indicative of a ratio of an ideal time to completion of an AI workload to a real time to completion of the AI workload; and wherein scheduling, by the scheduler, the set of AI workloads to a set of nodes of the cloud infrastructure platform includes scheduling AI workloads to meet the performance requirements of the priority tier of each AI workload.

further comprising: scheduling, by the processor of the global scheduler, multi-node AI workloads on a subset of nodes of the set of nodes based on balancing sums of the resource ticket values of AI workloads distributed to the subset of nodes, wherein the multi-node AI workloads are scheduled to be executed simultaneously on the subset of nodes.

wherein scheduling multi-node AI workloads by the processor of the global scheduler and scheduling the subset of AI workloads by the processor of the local scheduler of the first node includes scheduling AI workloads using a stride mechanism for each time quantum during execution of the AI workloads.

further comprising: monitoring, by the processor of the local scheduler of the first node, performance of the subset of AI workloads using the infrastructure resources of the first node based on heterogeneous types of infrastructure resources; and based on the monitoring indicating a difference in performance between a first AI workload and a second AI workload of the subset of AI workloads based on heterogenous types of infrastructure resources, trading, by the processor of the local scheduler of the first node, infrastructure resources between the first AI workload and second AI workload to balance out the indicated difference in performance.

wherein trading infrastructure resources between the first AI workload and the second AI workload includes: determining an exchange rate for trading a first type of infrastructure resource for a second type of infrastructure resource, wherein the determined exchange rate benefits the first AI workload and the second AI workload; and exchanging a first quantity of the first type of infrastructure resource associated with the first AI workload to the second AI workload for a second quantity of the second type of infrastructure resource associated with the second AI workload to the first AI workload, wherein the first quantity and second quantity are based on the determined exchange rate.

wherein scheduling the subset of AI workloads on the infrastructure resources of the first node includes: identifying an AI workload that is currently being executed using the infrastructure resources of the first node; and migrating the identified AI workload to another node, whereby infrastructure resources of the first node are freed for use in executing the subset of AI workloads.

wherein identifying the AI workload includes identifying the AI workload based on the AI workload being associated with a lower priority tier than at least one AI workload of the subset of AI workloads.

The embodiments illustrated and described herein as well as embodiments not specifically described herein but within the scope of aspects of the claims constitute an exemplary means for receiving, by a processor of a global scheduler, a set of AI workloads to be executed, wherein each AI workload of the set of AI workloads is associated with a resource ticket value indicative of a share of resources with which that AI workload is to be executed; exemplary means for distributing, by the processor of the global scheduler, the set of AI workloads to a set of nodes of the cloud infrastructure platform, wherein each node of the set of nodes includes infrastructure resources for use in executing AI workloads, and wherein the set of AI workloads are distributed to the set of nodes based on balancing resource ticket values of the AI workloads on each node of the set of nodes; exemplary means for scheduling, by a processor of a local scheduler of a first node of the set of nodes, a subset of AI workloads of the set of AI workloads distributed to the first node to be executed on the infrastructure resources of the first node, wherein the scheduling of the subset of AI workloads is based on the resource ticket values associated with the subset of AI workloads; and based on scheduling the subset of AI workloads distributed to the first node, exemplary means for executing, by a coordinator service of the local scheduler of the first node, the subset of AI workloads on the infrastructure resources of the first node.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for scheduling execution of artificial intelligence (AI) workloads in a cloud infrastructure platform, the system comprising:
   at least one processor of the cloud infrastructure platform, wherein the at least one processor includes at least one of: a central processing unit (CPU), a graphics processing unit (GPU), and a hardware accelerator; and
   at least one memory of the cloud infrastructure platform comprising computer program code, the at least one memory and the computer program code configured to, with the at least one processor, cause the at least one processor to:
      schedule, by the scheduler, a first AI workload to a first node of the cloud infrastructure platform, the first AI workload being associated with a first priority tier indicative of a preemption priority with which the first AI workload is associated while being executed, wherein the first node includes infrastructure resources for use in executing AI workloads, and wherein the first AI workload is distributed to the first node based the first priority tier of the first AI workload, wherein the first AI workload requires AI accelerator hardware to execute, the infrastructure resources including the accelerator hardware;
      based at least on scheduling the first AI workload, execute, the first AI workload on the infrastructure resources of the first node; and
      schedule, by the scheduler, a multi-node AI workload associated with a second priority tier to a plurality of nodes, the multi-node AI workload requiring AI accelerator hardware to execute, the plurality of nodes including the first node, each of the plurality of nodes including infrastructure resources including AI accelerator hardware for use in executing AI workloads, wherein the scheduling of the multi-node AI workload includes preempting the first AI workload associated with the first priority tier that is lower priority than the second priority tier, the preempting freeing capacity of the AI accelerator hardware for use by the multi-node AI workload.

2. The system of claim 1, wherein the scheduling of the multi-node Al workload includes computing a dynamic scheduling score based on a fixed amount based on the first priority tier associated with the first AI workload and a dynamic amount based on how close the first AI workload is to violating tier standards for the first priority tier, the preempting the first Al workload being based on the dynamic scheduling score.

3. The system of claim 1, wherein the scheduling of the multi-node AI workload is based at least on balancing sums of resource ticket values to the plurality of nodes, wherein components of the multi-node AI workload are scheduled to be executed simultaneously on the plurality of nodes.

4. The system of claim 1, wherein the scheduling the of the multi-node AI workload on the infrastructure resources of the first node further includes migrating the first AI workload to a second node, whereby infrastructure resources of the first node are freed for use in executing the multi-node AI workload.

5. The system of claim 1, wherein;
   the first and second priority tiers include performance requirements based at least on a throughput fraction value indicative of a ratio of an ideal time to completion of an AI workload to a real time to completion of the AI workload; and
   wherein the scheduling of the multi-node AI workload includes meeting the performance requirements of the second priority tier of the multi-node AI workload.

6. A computerized method for scheduling execution of AI workloads in a cloud infrastructure platform, the computerized method comprising:
   executing, a first AI workload on infrastructure resources of a first node and a second AI workload on infrastructure resources of a second node, the first and second AI workloads requiring infrastructure resources including AI accelerator hardware for execution, the infrastructure resource of the first and second nodes having different types of AI accelerator hardware;
   monitoring performance of the first AI workload and the second AI workload;
   based at least in part on the monitoring, determining a first performance improvement of the first AI workload when running on the different types of AI accelerator hardware and a second performance improvement of the second AI workload when running on the different types of AI accelerator hardware; and
   based on a comparison between the first performance improvement and the second performance improvement, trading the infrastructure resources between the first AI workload and the second AI workload, wherein the first AI workload is moved to the second node and the second AI workload is moved to the first node.

7. The computerized method of claim 6, further comprising:
   scheduling, by a processor of a global scheduler, a multi-node AI workload on a plurality of nodes based on balancing sums of resource ticket values to the plurality of nodes, wherein components of the multi-node AI workload are scheduled to be executed simultaneously on the plurality of nodes.

8. The computerized method of claim 7, wherein the scheduling of the multi-node AI workload, by the processor of the global scheduler, and the scheduling the first AI workload, by a processor of a local scheduler, includes using a stride mechanism for each time quantum during execution of the multi-node AI workload and the first AI workload.

9. The computerized method of claim 6, wherein:
   the monitoring of the performance of the first AI workload is by a processor of a local scheduler of the first node using the infrastructure resources of the first node based at least on heterogeneous types of infrastructure resources.

10. The computerized method of claim 9, wherein the trading of the infrastructure resources includes:
   determining an exchange rate for trading a first type of infrastructure resource for a second type of infrastructure resource, wherein the determined exchange rate benefits the first AI workload and the second AI workload; and
   exchanging a first quantity of the first type of infrastructure resource associated with the first AI workload to the second AI workload for a second quantity of the second type of infrastructure resource associated with the second AI workload to the first AI workload, wherein the first quantity and second quantity are based at least on the determined exchange rate.

11. One or more computer storage media having computer-executable instructions for scheduling execution of AI workloads in a cloud infrastructure platform that, upon execution by a processor, cause the processor to at least:
- identify, by a global scheduler, first and second of AI workloads to be executed, the first and second AI workloads requiring infrastructure resources including AI accelerator hardware for execution, wherein the first AI workload is associated with a first resource ticket value indicative of a share of resources with which the first AI workload is to be executed and the second AI workload is associated with a second resource ticket value indicative of a share of resources with which the second AI workload is to be executed;
- distribute, by the global scheduler, the first AI workload to a first node of a plurality of nodes of the cloud infrastructure platform and the second AI workload to a second node of the plurality of nodes, wherein the first and second nodes include infrastructure resources including the AI accelerator hardware for use in executing AI workloads, and wherein the first and second AI workloads are distributed to the first and second nodes based on balancing resource ticket values of the first and second AI workloads on the first and second nodes;
- schedule, by the global scheduler, a plurality of multi-node AI workloads onto at least two nodes of the plurality of nodes based at least on balancing sums of resource ticket values of the multi-node AI workloads, wherein the plurality of multi-node AI workloads are scheduled to be executed simultaneously on the plurality of nodes;
- schedule, by a local scheduler of a first node, a subset of AI workloads to the first node to be executed on the infrastructure resources of the first node, the subset of AI workloads including at least one AI workload, wherein the scheduling of the subset of AI workloads is based at least on the resource ticket values associated with the subset of AI workloads; and
- based at least on scheduling the subset of AI workloads to the first node, execute, by a coordinator service of the local scheduler of the first node, the subset of AI workloads on the infrastructure resources of the first node.

12. The one or more computer storage media of claim 11, wherein the scheduling of the plurality of multi-node AI workloads and the scheduling of the subset of AI workloads includes using a stride mechanism for each time quantum during execution of the multi-node AI workloads and the subset of AI workloads.

13. The one or more computer storage media of claim 11, wherein the computer-executable instructions, upon execution by a processor, further cause the processor to at least:
- monitor performance of the first and second AI workloads; and
- based at least on the monitoring, determining a first performance improvement of the first AI workload when running on different infrastructure resource types and a second performance improvement of the second AI workload when running on the different infrastructure resource types; and
- based on a comparison between the first performance improvement and the second performance improvement, trading infrastructure resources between the first AI workload and second AI workload, wherein the first AI workload is moved to the second node and the second AI workload is moved to the first node.

14. The one or more computer storage media of claim 13, wherein the trading of infrastructure resources includes:
- determining an exchange rate for trading a first type of infrastructure resource for a second type of infrastructure resource, wherein the determined exchange rate benefits the first AI workload and the second AI workload; and
- exchanging a first quantity of the first type of infrastructure resource associated with the first AI workload to the second AI workload for a second quantity of the second type of infrastructure resource associated with the second AI workload to the first AI workload, wherein the first quantity and second quantity are based at least on the determined exchange rate.

15. The one or more computer storage media of claim 11, wherein scheduling the subset of AI workloads on the infrastructure resources of the first node includes:
- identifying an AI workload that is currently being executed using the infrastructure resources of the first node; and
- migrating the identified AI workload to another node, whereby infrastructure resources of the first node are freed for use in executing the subset of AI workloads.

\* \* \* \* \*